United States Patent [19]

Ito et al.

[11] Patent Number: 5,174,938
[45] Date of Patent: Dec. 29, 1992

[54] PROCESS FOR PRODUCING FUEL ABSORBENT

[75] Inventors: Hiroshi Ito, Ichinomiya; Koji Sasaki, Nagoya; Tadaoki Okumoto, Inazawa; Takashi Ohta, Nagoya; Mitsumasa Matsushita, Nagoya; Norio Sato, Nagoya, all of Japan

[73] Assignees: Toyoda Gosei Co., Ltd., Nishikasugai; Kabushiki Kaisha Toyota Chuo Kenkyusho, Aichi, Japan

[21] Appl. No.: 687,470

[22] Filed: Apr. 19, 1991

[30] Foreign Application Priority Data

| Apr. 28, 1990 | [JP] | Japan | 2-113256 |
| Apr. 28, 1990 | [JP] | Japan | 2-113257 |
| Apr. 28, 1990 | [JP] | Japan | 2-113258 |
| Apr. 30, 1990 | [JP] | Japan | 2-114372 |
| Apr. 30, 1990 | [JP] | Japan | 2-114373 |

[51] Int. Cl.⁵ ............................. B29C 67/00
[52] U.S. Cl. ................... 264/112; 264/117; 264/118; 264/126; 427/180; 427/203; 427/222
[58] Field of Search .......... 264/109, 112, 123, 117, 264/118, 126; 427/180, 203, 222; 55/387

[56] References Cited

U.S. PATENT DOCUMENTS

| 3,686,827 | 8/1972 | Haigh et al. |
| 3,813,347 | 5/1974 | Hayes. |
| 3,844,739 | 10/1974 | Alfrey, Jr. |
| 4,481,239 | 11/1984 | Eckner ................. 427/203 |
| 4,568,418 | 2/1986 | Walko et al. ........ 264/117 |
| 4,684,382 | 8/1987 | Abu-Isa. |

FOREIGN PATENT DOCUMENTS 0370259 5/1990 European Pat. Off.
2292732 6/1976 France.

Primary Examiner—Mary Lynn Theisen
Attorney, Agent, or Firm—Cushman, Darby & Cushman

[57] ABSTRACT

The invention relates to a process for producing a fuel absorbent, which comprises the steps of: dissolving an organic polymer having a function of trapping fuel in a solvent to produce a polymer solution; adding a crosslinking agent to said polymer solution to allow said organic polymer to react in the presence of said crosslinking agent; and collecting, after the completion of the crosslinking reaction, the resultant fine polymer gel particles. The invention also relates to a porous fuel absorbent produced by the above process comprised of fine cross-linked organic polymer formed into particles. The above fuel absorbent along with the coatings and a carrier may be used to control fuel evaporation loss in automobile canisters or boiler fuel tanks.

59 Claims, 10 Drawing Sheets

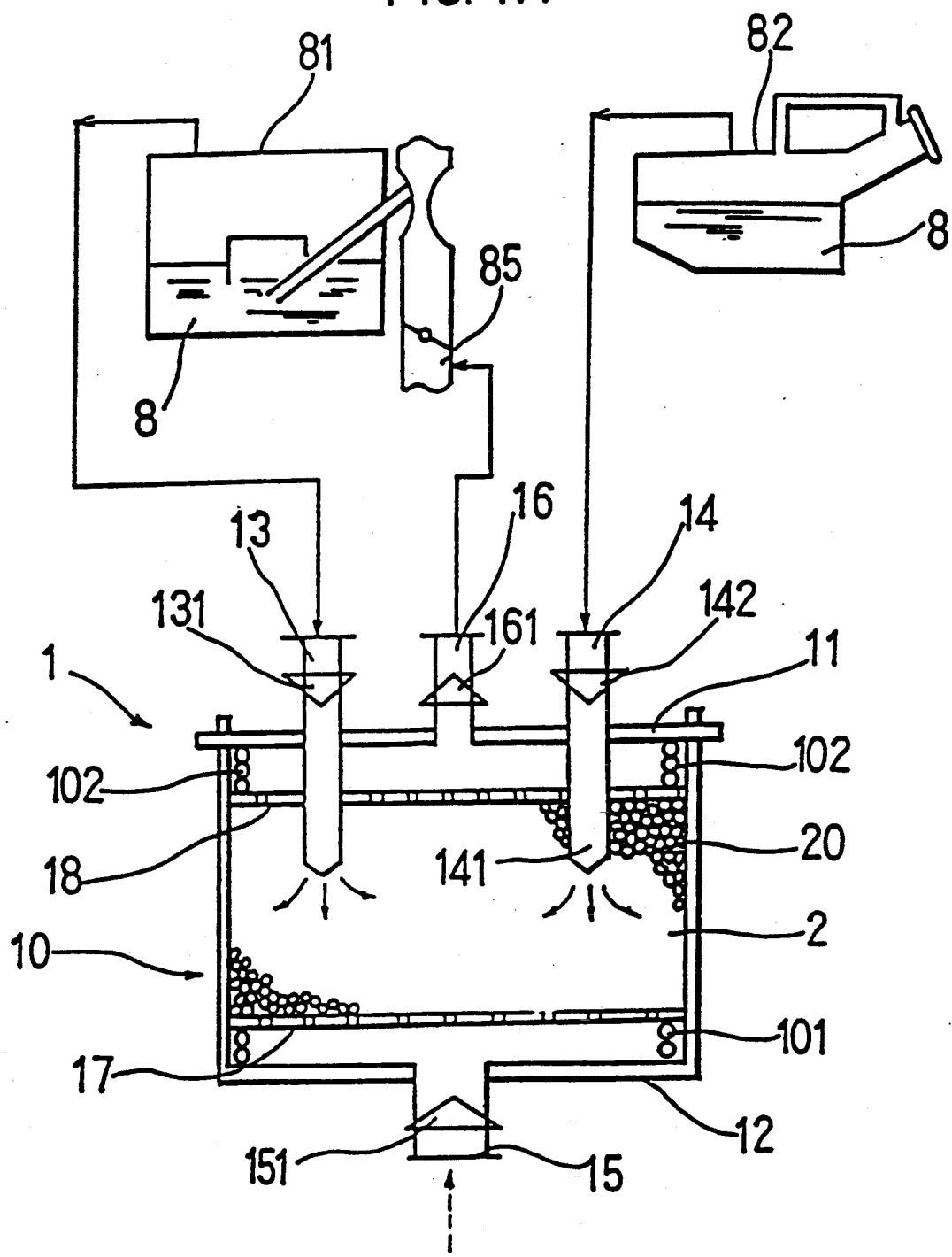

PROCESS FOR PRODUCING FUEL ABSORBENT

BACKGROUND OF THE INVENTION

1. Field of the Invention

The present invention relates to a process for producing a porous fuel absorbent to be used in evaporation loss control devices and the porous fuel absorbent produced by the process.

2. Description of the Related Arts

A fairly large amount of fuel evaporates when it is supplied to an automobile fuel tank through a feed nozzle. Part of the fuel in the fuel tank and the carburetor's float chamber also evaporates while the automobile is running or at rest.

In order to prevent the leakage of the evaporated fuel into the air atmosphere, a canister filled with an absorbent is attached to, e.g., the fuel tank. The absorbent in the canister serves to trap the evaporated fuel. Such an absorbent filled evaporation loss control device is also used to trap fuel evaporating or leaking from fuel storage tanks other than those installed on automobiles. In such evaporation loss control devices, charcoal has hitherto been used as a fuel absorbent. Fuel absorbed by charcoal can be desorbed therefrom at the time when the devices are subjected to purging. Charcoal can therefore be used repeatedly with repeated absorption and desorption of fuel (see FIG. 7 and explanations therefore given hereinbelow). However, canisters employing charcoal often fall into a state where the devices are incapable of trapping evaporated fuel to a sufficient degree and hence the untrapped fuel vapor is released into the air atmosphere.

The present inventors have investigated the cause of the phenomenon. As a result, it has now been found that the working capacity of charcoal (i.e., the capability of charcoal to trap gasoline vapor) decreases significantly when it is in contact with liquid gasoline. It has also been found that such a contact between charcoal and liquid gasoline occurs when liquid gasoline condensed on the inner surfaces of the piping around the canister or on the charcoal-free space at the top of the canister comes into contact with the charcoal.

Such undesirable condensation of gasoline vapor in the piping and the canister occurs most frequently when the temperature of the ambient air is high or when the vapor pressure of gasoline is very high in the fuel tank or carburetor.

There is another factor that causes the undesirable decrease in the working capacity of charcoal. While the fuel vapor absorbed on the charcoal is composed of various molecules of different sizes, those having not more than 4 or 5 carbon atoms can be readily desorbed during the canister purging step, but larger molecules could not be desorbed as readily as the small ones. Because of this difference in desorption rate, the working capacity of charcoal decreases as it is used for a long period of time.

It has been proposed to use organic polymers (such as polypropylenes, styrene-butadiene copolymers, etc.) in place of charcoal (see Japanese Patent Application (Laid Open) Nos. 67,222/89 and 227,861/89). The fuel-absorbing ability of such an absorbent decreases when the absorption and desorption of fuel (or absorption-desorption cycle) is repeated. This is presumably because the strength of primary particles and the bonding force between primary particles (or strength of secondary particles) are low, and hence primary particles are destroyed and secondary particles are disintegrated when they are repeatedly subjected, e.g., to swelling (during absorption) and shrinking (during desorption), or to vibration. Such destruction and disintegration lead to a lowering in its absorption capability due to the generation of fine particles, which easily scatter and cause an uneven distribution of the adsorbent. At the same time, with the decrease in the particle size, the percentage of voids (or porosity) in the absorbent becomes smaller. This also leads to a decrease in absorption capability since its pores become more liable to clog during swelling.

SUMMARY OF THE INVENTION

It is therefore an object of the present invention to provide a process for producing a fuel absorbent which is excellent not only in durability against the repetition of absorption-desorption cycles, but in the ability of trapping evaporated fuel.

There is provided by the present invention a process for producing a fuel absorbent, which comprises dissolving an organic polymer having the function of trapping fuel into a solvent; adding a crosslinking agent to the resulting solution to allow the organic polymer to react in the presence of said crosslinking agent; bonding, after the completion of the reaction, the resultant fine polymer gel particles with each other and/or on a carrier. The invention also relates to the fuel absorbent which is produced by the above process.

The above and other objects and features of the invention will appear more fully hereinafter from a consideration of the following description taken in connection with the accompanying drawing wherein one example is illustrated by way of example.

BRIEF DESCRIPTION OF THE DRAWINGS

FIGS. 7A and 7B are views explaining a canister according to Example 8.

DETAILED DESCRIPTION OF THE INVENTION

Figure 1:
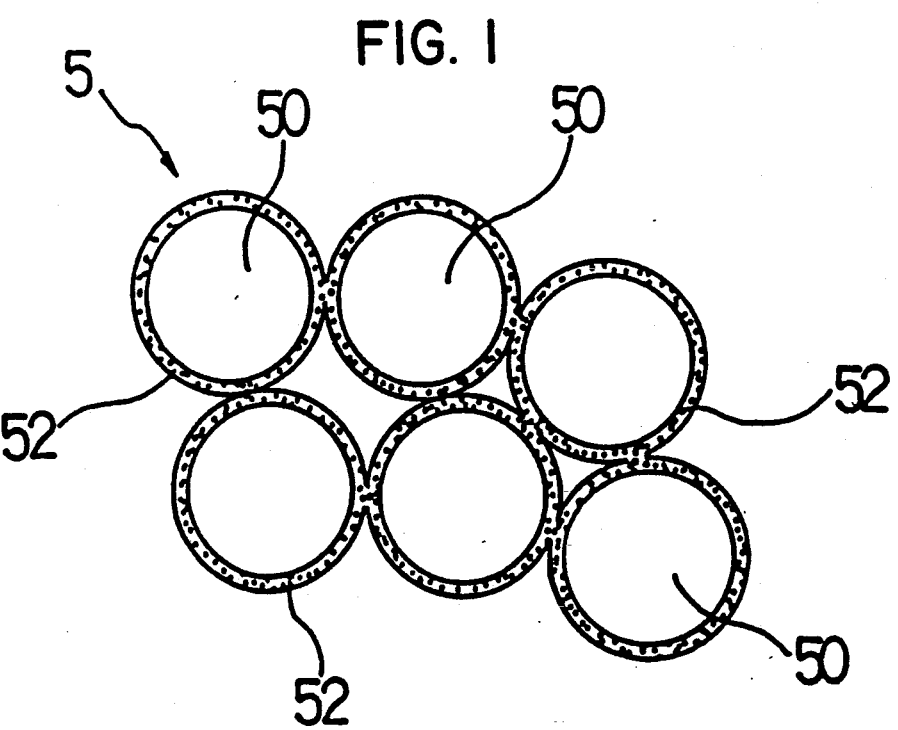
FIG. 1 is a schematic illustration showing the state of bonded particles according to Example 1.

This invention has five aspects which will hereinafter be described in detail.

According to the first aspect of this invention, there is provided a process for producing a fuel absorbent, which comprises dissolving an organic polymer having the function of trapping fuel into a solvent; adding with stirring the resulting polymer solution to a separately prepared solution containing a dispersant, to allow the organic polymer to react in the presence of a crosslinking agent; collecting, after the completion of the reaction, the fine polymer gel particles formed; and then subjecting the polymer particles collected to drying and granulation in such a state at least part of the dispersant remains thereon.

By "organic polymer having the function of trapping fuel" is herein meant an organic polymer that is capable of trapping evaporated fuel (and leaked fuel liquid, too) and can be cross-linked to at least such a level where a gel is formed. By the phrase "function of trapping" is herein meant the capability of dissolving fuel or of being swollen by fuel.

The phrase "to allow the polymer to react" herein means the polymer to undergo any chemical reactions, including crosslinking and polymerization. In the present process, such reactions can be allowed to proceed by means suspension polymerization or emulsion polymerization in the presence of a dispersing agent.

Examples of organic polymers usable in the present process include polypropylenes, polyethylenes, polyisoprenes, polybutadienes, polyisobutylenes, polystyrenes, polynorbornenes, silicone polymers such as vinylmethyl silicon, phenyl methyl silicon and methyl silicon, ethylene-propylene-diene copolymers, styrene-butadiene copolymers, ethylene-propylene copolymers, isobutylene-isoprene copolymers, butadiene-acrylonitrile copolymers, ethylene-vinyl acetate copolymers, acrylic polymers, styrene-isoprene copolymers, epoxy polymers, epichlorohydrin polymers such as epichlorohydrin-ethylene oxide and epichlorohydrin, and the like.

Examples of solvents usable for the reaction of the organic polymer include toluene, benzene, xylene, dimethylbenzene, trimethylbenzene, cyclohexane, pentane, hexane, heptane, methylene chloride, chloroform, carbon tetrachloride, trichloroethylene, and the like.

The most characteristic feature of this process is that the fuel absorbent is produced by reacting an organic polymer having the function of trapping fuel in a dispersant containing solution in the presence of a crosslinking agent; collecting the fine polymer gel particles formed; and then subjecting the polymer particles to granulation in such a state where the dispersant attached to the particles are not removed at all or in such a state where part of the dispersant remains thereon.

The organic polymer and the solvent are used preferably in the following ratio: organic polymer, 2 to 50 wt %; solvent, 50 to 98 wt %.

Examples of usable crosslinking agents include, as peroxide agents, diacyl peroxides, such as benzoyl peroxide and lauroyl peroxide; hydroperoxides, such as 2,4,4-trimethylpentyl-2-hydroperoxide, etc.; dialkyl peroxides, such as dicumyl peroxide, etc.; peroxy ketals, such as 1,1-di-t-butyl peroxy-3,3,5-trimethylcyclohexane, etc.; alkyl peresters, such as t-butyl peroxyneodecanoate, etc.; percarbonates, such as bis(4-t-butyl cyclohexyl)peroxy dicarbonate, etc.; and ketone peroxides, such as methyl ethyl ketone peroxide, etc.

It is also possible to use other conventional crosslinking agents, such as sulfur, sulfur compounds, amine compounds, isocyanate compounds, epoxy compounds, carboxy compounds, and the like.

If desired, crosslinking aids may be used together with crosslinking agents to promote the reaction.

Examples of crosslinking aids usable in combination with the above-mentioned peroxide crosslinking agents include tetrahydrofurfuryl methacrylate, ethylene dimethacrylate, 1,3-butylene dimethacrylate, polyethylene glycol methacrylate, 2,2-bis(4-methacryloxydiethoxyphenyl)propane, aluminum methacrylate, calcium dimethacrylate, triallyl isocyanurate, diallyl phthalate, divinylbenzene, p-quinone oxime, 1,2-polybutadiene, sulfur, and the like. Other conventional crosslinking aids can also be used in combination with conventional crosslinking agents other than the above peroxides.

Crosslinking agents can be used in an amount of 1 to 20 wt %, and crosslinking aids in an amount of 0 to 20 wt %, both based on the weight of the polymer.

It can be preferable to remove oxygen from the solution of the organic polymer before it is subjected to the reaction. For example, nitrogen gas can be bubbled into a solution of the polymer. Alternatively, a container containing the polymer solution may be repeatedly evacuated and filled with nitrogen gas. By such operations, oxygen gas dissolved in the solution can be removed therefrom.

A dispersion is then prepared by adding the polymer solution to a dispersant-containing solution, during which the latter solution is stirred and heated at a temperature of 40° to 55° C. The reaction of the polymer is allowed to proceed, while stirred with heating, until the crosslinking agent has been decomposed almost completely.

Examples of usable dispersants include polyvinyl alcohols (PVA), gelatin, tragacanth gum, gum arabic, starch, methyl celluloses, carboxymethyl celluloses, polyacrylates, and the like. It can be preferable to subject the dispersant-containing solution to deoxidation, as in the case of the polymer solution. In usual cases, water is used as a solvent for the dispersant containing solution. Dispersant may be contained in the solution at a concentration of ca. 1 to 5 wt %.

After the completion of the reaction, the reaction mixture is cooled to allow it to separate into two phases: a polymer layer and an aqueous layer. Then, the polymer layer (upper layer) is separated to collect a paste of creamy fine polymer gel particles. The paste contains fine polymer gel particles having a grain size (an average particle diameter) of 10 to 100 μm, together with the solvent and the dispersant.

Then, the polymer gel particles are dried to give solvent-free polymer particles having dispersant attached thereto.

Thereafter, the dried fine polymer gel particles are granulated by a granulator, such as high speed mixers or spray dryers, to give a granular fuel absorbent having a grain size of ca. 1 to 5 mm. The thus obtainable fuel absorbent is composed of fine polymer particles mutually bonded with the dispersant, such as PVA, which is present on the surface of the particles (see FIGS. 1 and 2). In other words, in this fuel absorbent, the dispersant plays a role as a binder.

Alternatively, the creamy polymer gel particles are washed, immediately after the reaction, with warm water of 50° to 70° C., up to such a state where the crosslinking agent, crosslinking aid and unreacted polymer have been washed away, but a small portion of the dispersant still remains. The resulting polymer particles are then dried and granulated as above. In this case, too, the dispersant functions as a binder, and a fuel absorbent composed of fine polymer particles mutually bonded with the dispersant can be obtained. It is also possible to carry out the washing by using solvent not dissolving the dispersant. In this case, the creamy fine polymer gel particles are washed, immediately after the reaction, with such a solvent to give fine polymer particles having the dispersant remaining on the whole surface thereof. The desired fuel absorbent consisting of polymer articles mutually bonded with the dispersant can be obtained by granulating the resulting particles as described above.

Examples of solvents not dissolving the dispersant include toluene, ethyl alcohol, and the like. Although the crosslinking agent, crosslinking aid and unreacted polymers are washed way during the course of the washing, the dispersant remains unremoved.

It can be preferable to additionally form a coating of reactive substance on the surface of the fuel absorbent. By such a coating, the strength of the fuel absorbent can be further improved and its durability against the absorption-desorption cycle can be further improved. It can be effective, cases where the porosity of the absorbent is no less important than its strength, to form a coating of reactive substance having a network structure, thus preventing pores in the primary particles of the absorbent from being clogged by the coating. By the term "reactive substance" is herein meant a substance which is capable of undergoing such a reaction as crosslinking, elongation of chain, or the like. Thermosetting resins can be used with advantage as a reactive substance. Specific examples of usable thermosetting resins include urethane, epoxy, silicone and amino resins.

The coating can be formed, e.g., by spraying a solution concentration (1 to 50%) of a reactive substance onto the surface of the fuel absorbent, or by dipping the absorbent into such a solution. Examples of solvents usable for the solution include aromatic hydrocarbons, fatty hydrocarbons, alcohols, ketones, water, and the like. It can be preferable to form a coating layer which can be flexible enough to follow any possible deformation of the absorbent.

The thickness of the coating is preferably in the range of 0.1 to 500 μm. When it is less than 0.1 μm, the strength of the fuel absorbent will be improved only insufficiently, whereas when it exceeds 500 μm, there may result a marked decrease in its fuel trapping capacity.

Such a coating can also be applied to the fuel absorbent prepared from fine polymer gel particles washed with hot water, as well as to the fuel absorbent prepared from fine polymer gel particles washed with a solvent not dissolving the dispersant.

The thus obtainable fuel absorbent is basically in the form of granules, and the granules can be shaped into any desired form, including, e.g., honeycombs, plates and films.

The fuel absorbent according to the present invention does not dissolve in fuel and only swells by trapping (or absorbing) evaporated fuel. The absorbent can therefore be regenerated by purging (or eliminating) the trapped fuel, and used repeatedly.

The fuel absorbent according to the invention can be used not only in automobile canisters, but in any other evaporation loss control devices, including those to be applied to fuel tanks of boilers.

One characteristic feature of the porous fuel absorbent obtainable by the process of the invention lies in that primary particles of the organic polymer having the function of trapping fuel are mutually bonded with the binder, forming pore-rich coarse secondary particles.

Figure 8A:
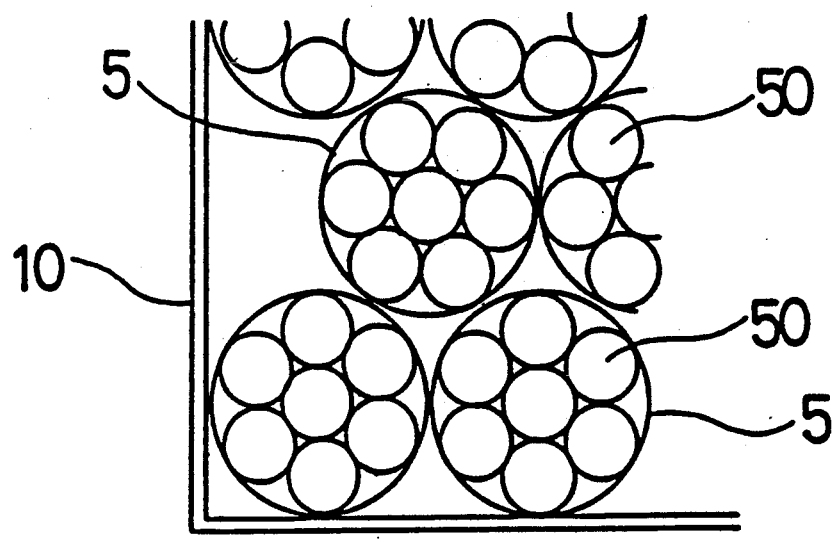
FIGS. 8A and 8B are schematic views illustrating the porosity of fine particles and grains of fuel absorbent.
Figure 8B:
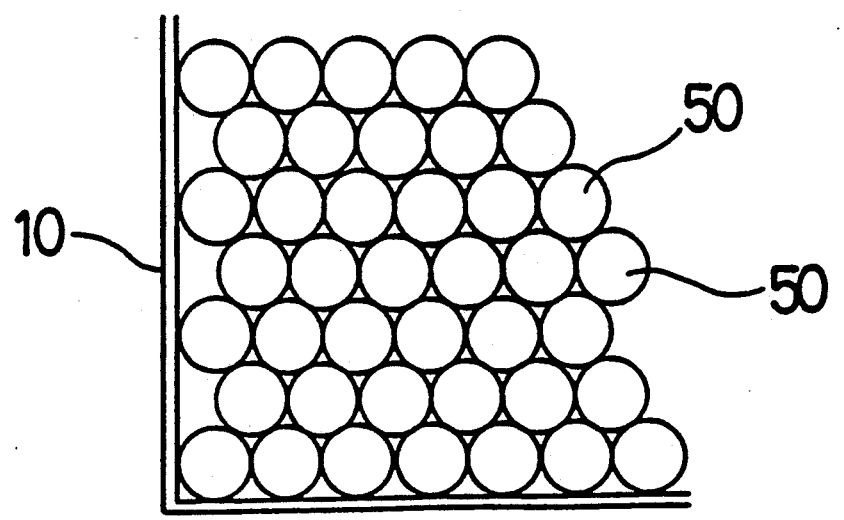

It should be noted that the absorbent, when added to a container, constitutes a pore-rich, highly efficient fuel absorbent with fine pores among primary particles, and coarse pores among secondary particles. In addition, such a pore-rich structure is fixed by the binder (or dispersant). On the assumption, as shown in FIG. 8A, that both the fine polymer particles 50 (primary particles) and the fuel absorbents 5 (secondary particles) are perfectly spherical, the theoretical total porosity (i.e., the combined porosity of the primary pores and the secondary pores) in the container 10 containing the absorbent 5 is as high as ca. 73%. On the other hand, when fine polymer particles 50 are simply placed in the container 10, as shown in FIG. 8B, there will be formed primary pores alone, giving a porosity as low as ca. 48%.

The fuel absorbent produced in accordance with the process of the invention is highly capable of trapping fuel. This is because the organic polymers used as a base material have the power to swell to a considerable extent through absorption of fuel, such as gasoline, due to its strong affinity for evaporated fuel.

The fuel absorbent is produced by reacting such a polymer in the presence of a crosslinking agent, using a dispersant, and the dispersant per se is later used as a binder as it is. Accordingly, the fuel absorbent can be produced without using any additional binder.

In addition, the absorbent according to the invention has an increased physical strength as a whole since the fine polymer particles contained therein are mutually bonded with the dispersant. The absorbent can therefore be highly excellent in its durability against the absorption-desorption cycle, i.e., repeated trapping and releasing of fuel.

Moreover, in the fuel absorbent according to the invention, the organic polymers are chemically bonded to each other, and hence the resultant fuel absorbent has a three-dimensional structure. Because of this, the absorbent can be highly flexible as a whole and exhibits a highly enhanced fuel trapping capability.

When the fuel absorbent has swelled through absorption of fuel, the evaporation loss control device containing the same can be subjected to purging to release the trapped fuel. The absorbent recovers its fuel trapping ability through the purging and can therefore be used repeatedly.

As described hereinabove, there can be provided a process for producing a fuel absorbent which is excellent not only in durability against the absorption-desorption cycle, but in the ability of trapping fuel.

As the second aspect of this invention, there is provided a process for producing a fuel absorbent, which comprises dissolving an organic polymer having the function of trapping fuel into a solvent; adding with stirring the resulting solution to a separately prepared solution containing a dispersant, to allow the organic polymer to react in the presence of a crosslinking agent; collecting, after the completion of the reaction, the fine polymer gel particles formed; coating the fine polymer gel particles collected on a carrier in such a state at least part of the dispersant remains thereon; and then subjecting the resulting product to drying.

The most characteristic feature of this process is that the fuel absorbent is produced by reacting an organic polymer having the function of trapping fuel in a dispersant containing solution in the presence of a crosslinking agent; collecting the fine polymer gel particles formed; and then coating the fine polymer gel particles on a carrier and drying in such a state where the dispersant attached to the particles are not removed at all or in such a state where part of the dispersant remains thereon.

The phrase "to allow the polymer to react" herein means to allow the polymer to undergo any chemical reactions, including crosslinking and polymerization. In the present process, such reactions can be allowed to proceed by means of suspension polymerization or emulsion polymerization in the presence of a dispersing agent.

The organic polymer, solvent, crosslinking agent, crosslinking aid and dispersant used in this process and the following ones are the same as in the former process unless otherwise stated.

The organic polymer and the solvent are used preferably in the following ratio: organic polymer, 2 to 50 wt %; solvent, 50 to 98 wt %.

Crosslinking agents can be used in an amount of 1 to 20 wt %, and crosslinking aids in an amount of 0 to 20 wt %, both based on the weight of the polymer.

It can be preferable to remove oxygen from the solution of the organic polymer before it is subjected to the reaction. For example, nitrogen gas can be bubbled into a solution of the polymer. Alternatively, a container containing the polymer solution may be repeatedly evacuated and filled with nitrogen gas. By such operations, oxygen gas dissolved in the solution can be removed therefrom.

A dispersion is then prepared by adding the polymer solution to a dispersant-containing solution, during which the latter solution is stirred and heated at a temperature of 40° to 55° C. The reaction of the polymer is allowed to proceed, while stirred with heating, until the crosslinking agent has been decomposed almost completely. It can be preferable to subject the dispersant-containing solution to deoxidation, as in the case of the polymer solution. In usual cases, water is used as a solvent for the dispersant containing solution. Dispersant may be contained in the solution at a concentration of ca. 1 to 5 wt %.

After the completion of the reaction, the reaction mixture is cooled to allow it to separate into two phases: a polymer layer and aqueous layer. Then, the polymer layer (upper layer) is separated to collect a paste of creamy fine polymer gel particles. The paste contains fine polymer gel particles having grain size of 10 to 100 μm, together with the solvent and the dispersant.

Subsequently, the creamy polymer gel particles are coated on the surface of a carrier and dried. During the course of drying, the solvent is released, thereby forming a porous fuel absorbent comprising a carrier having thereon a large number of fine polymer particles bonded with the dispersant.

Examples of carriers usable in the present invention include granules, plates, cloths, nets and threads, which can be made of, e.g., plastics, ceramics or metals. The coating of the fine polymer gel particles can be effected by means of dipping. Alternatively, the creamy fine polymer gel particles, either diluted or not diluted with water or other solvents, can be applied onto the surface of a carrier by using a spray gun, or the like. It is also possible to utilize the roller coating technique to coat the creamy fine polymer gel particles onto a carrier.

Figure 9:
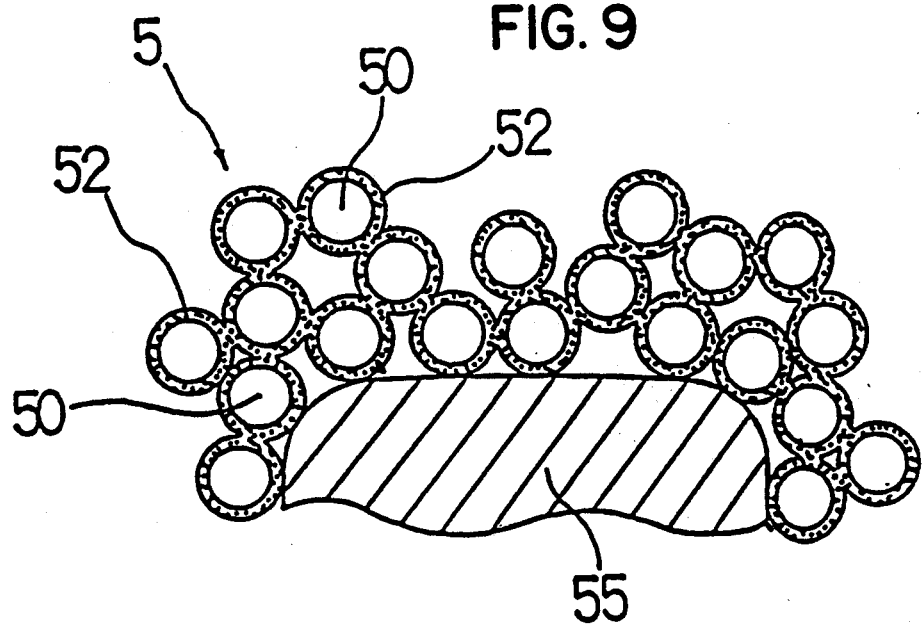
FIG. 9 is a schematic illustration showing the bonding state of bonded fine polymer particles in the fuel absorbent according to Example 9.
Figure 10:
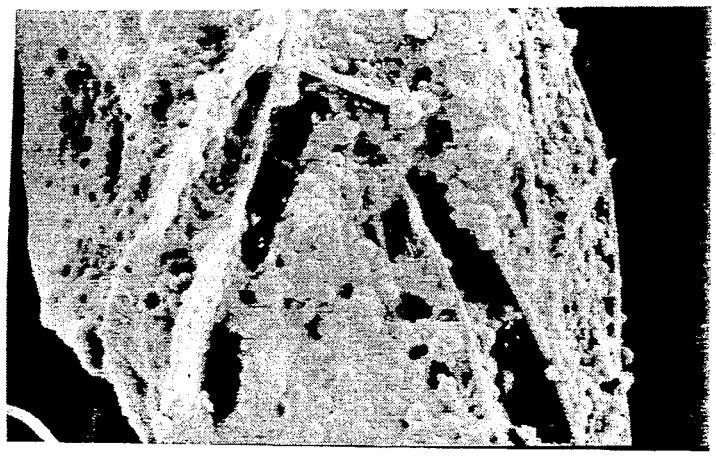
FIG. 10 is a microphotograph taken by a scanning electron microscope, showing the structure of dried fine polymer particles according to Example 9.

In the thus obtainable fuel absorbent, the fine polymer particles are mutually bonded with the dispersant, such as PVA, which is present on the surface of the particles and functions as a binder (see FIGS. 9 and 10). On the surface of the fine polymer particles is formed a layer of the dispersant that contributes to the mutual bonding of the fine particles, as well as to the bonding of the particles to the carrier, and the particles and the carrier constitute a porous spatial structure capable of trapping fuel in a highly efficient manner.

Alternatively, the creamy fine polymer gel particles are washed, immediately after the reaction, with warm water of 50° to 70° C., up to such a state where the crosslinking agent, crosslinking aid and unreacted polymer have been washed away, but a small portion of the dispersant still remains. The resulting fine polymer gel particles are then coated on carrier and dried. In this case, too, the dispersant functions as a binder, and a fuel absorbent comprising a carrier having thereon fine polymer particles mutually bonded with the binder can be obtained.

It is also possible to carry out the washing by using a solvent not dissolving the dispersant. In this case, the creamy fine polymer gel particles are washed, immediately after the reaction, with such a solvent to give fine polymer particles having the dispersant remaining on the whole surface thereof. The desired fuel absorbent consisting of a carrier having thereon fine polymer particles mutually bonded with the dispersant can be obtained by coating the resulting particles on a carrier and then subjecting the coated product drying.

Examples of solvents not dissolving the dispersant include toluene, ethyl alcohol, and the like. Although the crosslinking agent, crosslinking aid and unreacted polymer are washed away during the course of the washing, the dispersant remains unremoved.

It can be preferable to additionally form a coating of reactive substance on the surface of the fuel absorbent. By such a coating, the strength of the fuel absorbent can be further improved and its durability against the absorption-desorption cycle can be further improved. In cases where the porosity of the absorbent is no less important than its strength, the volume of usable reactive substance is subject to restriction, in order not to clog the pores with the coating.

By the term "reactive substance" is herein meant a substance which is capable of undergoing such a reaction as crosslinking, elongation of chain, or the like. Thermosetting resins can be used with advantage as a reactive substance. Specific examples of usable thermosetting resins include urethane, epoxy, silicone and amino resins.

The coating can be formed, e.g., by spraying a solution (concentration: 1 to 50%) of a reactive substance onto the surface of the fuel absorbent, or by dipping the absorbent into such a solution. Examples of solvents usable for the solution include aromatic hydrocarbons, fatty hydrocarbons, alcohols, ketones, water, and the like. It can be preferable to form a coating layer which can be flexible enough to follow any possible deformation of the absorbent.

The thickness of the coating is preferably in the range of 0.1 to 500 $\mu$m. When it is less than 0.1 $\mu$m, the strength of the fuel absorbent will be improved only insufficiently, whereas when it exceeds 500 $\mu$m, there may result a marked decrease in its fuel trapping capacity.

Such a coating can also be applied to the fuel absorbent prepared from fine polymer gel particles washed with warm water, as well as to the fuel absorbent prepared from fine polymer gel particles washed with a solvent not dissolving the dispersant.

Although the shape of the thus obtainable fuel absorbent is basically identical with that of the carrier used, it can be shaped into any desired form, including, e.g., honeycombs, plates and films.

The fuel absorbent according to the present invention does not dissolve in fuel and only swells by trapping (or absorbing) evaporated fuel. The absorbent can therefore be regenerated by purging (or eliminating) the trapped fuel, and can be used repeatedly.

The fuel absorbent according to the invention can be used not only in automobile canisters, but in any other evaporation loss control devices, including those to be applied to fuel tanks of boilers.

In the porous fuel absorbent obtained by the process of the invention, fine particles of an organic polymer having the function of trapping fuel are mutually bonded with a binder, forming a pore-rich spatial structure, and at the same time are bonded to a carrier with the same binder.

It should be noted that the fuel absorbent having such a skeleton of carrier can be highly resistant to impact, can be distributed uniformly in a fuel-absorbing chamber, and is capable of trapping fuel in a highly efficient manner, because of the pore-rich spatial structure.

The fuel absorbent produced in accordance with this process is consists of a carrier and a porous layer of fine polymer particles formed on the surface of the carrier. The porous layer on the carrier is highly capable of trapping fuel. This is because the organic polymer used as a base material has the power to swell to a considerable extent through absorption of fuel, such as gasoline, due to its strong affinity for evaporated fuel.

The fuel absorbent as a whole has a markedly enhanced strength since it is provided with a skeleton of carrier. In addition, the absorbent has a large surface area for the volume of fine polymer particles since the particles are positioned on the surface of the carrier, forming a layer having fine pores between fine particles. Accordingly, the absorbent can be high in its capacity of trapping fuel, per unit volume of fine polymer particles.

The fuel absorbent is produced by reacting such a polymer in the presence of a crosslinking agent, using a dispersant, and the dispersant per se is later utilized as a binder as it is. Accordingly, the fuel absorbent can be produced without using any additional binder.

In addition, the absorbent according to the invention has an increased strength as a whole since the fine polymer particles contained therein are mutually bonded with the dispersant. The absorbent can therefore be highly excellent in its durability against the absorption-desorption cycle, i.e., repeated trapping and releasing of fuel. The durability can be further improved when the absorbent is provided with the coating, as described hereinabove.

Moreover, in the fuel absorbent according to the invention, the organic polymers are chemically bonded to each other, and hence the resultant fuel absorbent has a three-dimensional structure. Because of this, the absorbent can be highly flexible as a whole and exhibits a highly enhanced fuel trapping capability.

When the fuel absorbent has swelled through absorption of fuel, the evaporation loss control device containing the same can be subjected to purging to release the trapped fuel. The absorbent recovers its fuel trapping ability through the purging and can therefore be used repeatedly.

As described hereinabove, there can be provided a process for producing a fuel absorbent which is excellent not only in durability against the absorption-desorption cycle, but in the ability of trapping fuel.

As the third aspect of this invention, there is provided by the present invention a process for producing a fuel absorbent, which comprises dissolving into a solvent an organic polymer having the function of trapping fuel and a thermoplastic resin binder; allowing the organic polymer to react in the presence of a crosslinking agent; collecting, after the completion of the reaction, the polymer gel formed; drying and granulating the polymer gel to obtain intermediate granules; and then heating the granules to a temperature at which said thermoplastic resin binder fuses.

By "organic polymer having the function of trapping fuel" is herein meant an organic polymer that is capable of trapping evaporated fuel (and leaked fuel liquid, too) and can be crosslinked to at least such a level where a gel is formed. By the phrase "function of trapping" is herein meant the capability of dissolving in fuel or of being swollen by fuel.

The phrase "to allow the polymer to react" herein means to allow the polymer to undergo any chemical reactions, including crosslinking and polymerization. Such reactions can be allowed to proceed in any form, including, e.g., suspension polymerization, emulsion polymerization and solution polymerization. As is shown hereinbelow, fine polymer gel particles are obtained when such polymers are subjected to suspension or emulsion polymerization, and a polymer gel is formed in the case of suspension polymerization.

The organic polymer and the solvent are used preferably in the following ratio: organic polymer, 2 to 70 wt %; solvent, 30 to 98 wt %.

Examples of thermoplastic resins usable as a binder include olefinic resins, such as PP (polypropylenes), PE (polyethylenes), EVA (ethylene-vinyl acetate copolymers), etc.; styrene resins, such as polystyrenes, styreneacrylonitrile copolymers, etc.; acrylic resins;

polycarbonate resins; and acid-modified polyolefin resins, such as polyolefins grafted with maleic anhydride.

The thermoplastic resin is used as a binder for mutually fusing granules, as is explained hereinbelow. The resin does not participate in said reaction of the organic polymer and undergoes crosslinking only to such an extent that its fusing ability is not substantially impaired. It is necessary to use an organic polymer and a thermoplastic resin which dissolve in the solvent.

The thermoplastic resin is used in an amount of 10 to 50% by weight, based on the weight of the organic polymer. When it is less than 10% by weight, the resin will play its role as a binder only insufficiently, whereas when it exceeds 50% by weight, there may result an undesirably low fuel — trapping capability due to excessive presence of the resin.

The thermoplastic resin is dissolved into a solution containing the organic polymer, before the latter is subjected to the gel-forming reaction. Part of the resin is therefore included in the structure of fine polymer gel particles, and functions as a binder therefore. Accordingly, the particles can be physically strong and resistant to impact or the like.

Figure 13:
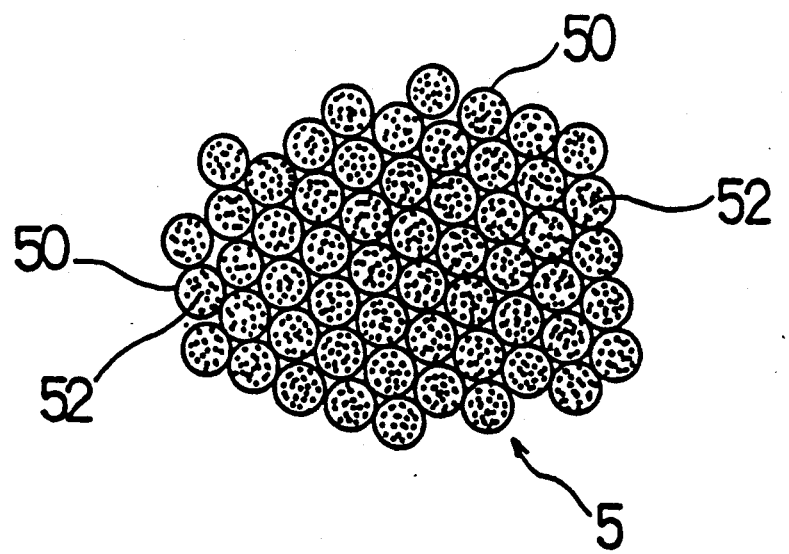
FIG. 13 is a schematic illustration showing the state of bonded fine polymer particles in the fuel absorbent according to Example 16.

In addition, the particles can be bound by the binder thereby forming porous secondary grains, as is shown in FIG. 13. Such grains can be placed in an absorption chamber with a high porosity and hence exhibit a highly enhanced absorption efficiency.

It is preferable to use a crosslinking agent that is capable of crosslinking the organic polymer having the function of trapping fuel, but is incapable of crosslinking the thermoplastic resin used as a binder.

If desired, crosslinking aids may be used together with crosslinking agents to promote the reaction.

Crosslinking agents can be used in an amount of 1 to 20 wt %, and crosslinking aids in an amount of 0 to 20 wt %, both based on the weight of the polymer.

It can be preferable to remove oxygen from the solution of the organic polymer before it is subjected to the reaction. For example, nitrogen gas can be bubbled into a solution of the polymer. Alternatively, a container containing the polymer solution may be repeatedly evacuated and filled with nitrogen gas. By such operations, oxygen gas dissolved in the solution can be removed.

In the case of suspension polymerization or emulsion polymerization, the reaction can be carried out, in the manner set forth below, using a dispersant-containing solution. At first, a solution containing an organic polymer and crosslinking agent is added with stirring to a solution containing a dispersant. The suspension is then stirred until the crosslinking agent has been decomposed almost completely, thus allowing the reaction of the organic polymer to proceed in the presence of dispersant.

Examples of usable dispersant include polyvinyl alcohols (PVA), gelatins, tragacanth gum, gum arabic, starch, methyl celluloses, carboxymethyl celluloses, polyacrylates, alkaline soaps, organic amino soaps, sulfates of higher alcohols, synthetic surface active agents, such as nonionic surfactants (e.g., Tweens), proteins, vegetable gums, alginates, saponin, and the like.

It can be preferable to subject the dispersant-containing solution to deoxidation prior to the reaction, as in the case of the polymer solution. In usual cases, water is used as solvent for the dispersant-containing solution. Dispersant may be contained in the solution at a concentration of ca. to 5% by weight.

After the completion of the reaction, the reaction mixture is cooled to allow it to separate into two phases: a polymer layer and an aqueous layer. Then, the polymer layer (upper layer) is separated, to collect a paste of creamy fine polymer gel particles. The paste contains fine polymer gel particles having grain size of 10 to 100 $\mu$m, together with the thermoplastic resin, the solvent and the dispersant.

It can be preferable to remove the dispersant from the paste by washing it with warm water of 50 to 70° C. By this operation, there can be obtained fine polymer gel particles composed of fine polymer particles blended with the thermoplastic resin.

Thereafter, the resulting fine polymer gel particles containing the thermoplastic resin are granulated by a granulator, such as a high speed mixer or a spray drier, to give intermediate granules having a grain size of ca. 1 to 5 mm. In the thus obtained granules, the fine polymer particles are mutually bound in a non-tight state with the other blended component, i.e., thermoplastic resin (see FIG. 13).

On the other hand, in the case of solution polymerization, a crosslinking agent is added to a solution of an organic polymer, and then the reaction of the polymer is performed without using any dispersant. By this reaction, a polymer gel can be obtained. The polymer gel formed is preferably washed with water or a solvent, and then reduced into granules having a grain size within the above range, by means of, e.g., ordinary pulverization or freeze-pulverization.

The granules are then heated to a temperature at which the thermoplastic resin fuses (for example, 80° to 120° C. in the case of EVA), whereby the thermoplastic resin present on the surface of granules fuses to mutually bond the granules, forming a physically strong fuel absorbent.

Alternatively, a fuel absorbent supported by a carrier can be produced by coating the fine polymer gel particles on a carrier.

In this case, the fine polymer gel particles are coated on a carrier and then dried, whereby the solvent is released, to form an intermediate product in which a large number of fine polymer particles are bound with the thermoplastic resin in a non-tight state and attached on the surface of the carrier. The intermediate product is then heated to a temperature at which the thermoplastic resin fuses. By this procedure, there can be obtained a supported fuel absorbent comprising fine polymer particles fused on a carrier with the thermoplastic resin.

It is also possible to produce a supported fuel absorbent in the same manner as above, by using the polymer gel in place of the fine polymer gel particles.

Examples of usable carriers include granules, plates, cloths and threads, which may be made of plastics, ceramics, metals, or the like. The coating of the fine polymer gel particles can be performed by dipping the carrier into the fine polymer gel particles. Alternatively, the paste of the gel particles can be applied on a carrier by using a spray gun, or the like.

The granular fuel absorbent obtained as above can be shaped into any desired form, including, e.g., honeycombs, plates, and films.

The shape of the fuel absorbent supported by a carrier is basically identical with that of the carrier used. The absorbent however can also be shaped into any desired form, including honeycombs and plates. The thickness or diameter of such fuel absorbent is preferably in the above range.

The fuel absorbent according to the present invention does not dissolve in fuel and only swells by trapping (or absorbing) evaporated fuel. The absorbent can therefore be regenerated by purging (or eliminating) the trapped fuel, and be used repeatedly.

The fuel absorbent according to the invention can be used not only in automobile canisters, but in any other evaporation loss control devices, including those to be applied to fuel tanks of boilers.

The fuel absorbent produced in accordance with this process is highly capable of trapping fuel. This is because the organic polymer used as a base material have the power to swell to a considerable extent through absorption of fuel, such as gasoline, due to its strong affinity for evaporated fuel.

In the fuel absorbent according to the present invention, the fine polymer particles are mutually bound with the thermoplastic resin. Accordingly, the absorbent as a whole has a markedly enhanced physical strength and can be highly resistant against the absorption-desorption cycle to trap and release fuel.

The organic polymers in the fuel absorbent are chemically bonded to each other, giving a three-dimensional structure to the absorbent. Because of this, the absorbent as a whole can be highly flexible and has a highly enhanced fuel trapping capability.

In the case where the absorbent is supported by a carrier, it has a markedly enhanced physical strength as a whole since the carrier functions as a skeleton. In addition, the absorbent as a large surface area for the volume of fine polymer particles used since the particles are positioned on the surface of the carrier. The unit volume capacity of the absorbent to absorb fuel can therefore be high.

When the fuel absorbent has swelled through absorption of fuel, it can be subjected to purging to release the trapped fuel. The absorbent recovers its fuel trapping ability through purging and can therefore be used repeatedly.

As described hereinabove, there can be provided a process for producing a fuel absorbent which is excellent not only in durability against the absorption-desorption cycle, but in the ability of trapping fuel.

As the fourth aspect of this invention, there is provided by the present invention a process for producing a fuel absorbent, which comprises dissolving an organic polymer having the function of trapping fuel into a solvent; adding to the resulting solution a binder of thermoplastic resin powders; allowing the organic polymer to react in the presence of a crosslinking agent, to form a thermoplastic resin powder-containing polymer gel; collecting, after the completion of the reaction, the polymer gel formed; subjecting the polymer gel to granulation to obtain intermediate granules; and then heating the granules to a temperature at which said thermoplastic resin powders fuse and adhere mutually.

By "organic polymer having the function of trapping fuel" is herein meant an organic polymer that is capable of trapping evaporated fuel (and leaked fuel liquid, too) and can be crosslinked to at least such a level a gel is formed. By the phrase "function of trapping" is herein meant the capability of dissolving fuel or of being swollen by fuel.

The phrase "to allow the polymer to react" herein means to allow the polymer to undergo any chemical reactions, including crosslinking and polymerization. Such reactions may be allowed to proceed in any form, including, e.g., suspension polymerization, emulsion polymerization and solution polymerization. As is shown hereinbelow, there can be obtained a gel of fine polymer particles by suspension polymerization or emulsion polymerization, and a polymer gel in the case of solution polymerization.

The organic polymer and the solvent are used preferably in the following ratio: organic polymer, 2 to 50% by weight; solvent, 50 to 98% by weight.

Examples of thermoplastic resin powders usable as a binder include such crystalline polymers as PP, PE, PBT (polybutylene terephthalate), PET (polyethylene terephthalate), POM (polyoxymethylene) and nylon. As is explained hereinbelow, such thermoplastic resin powders are used as a binder for mutually adhering intermediate granules through their fusion. The resin does not participate in said reaction of the organic polymer. It undergoes crosslinking not at all or only to such an extent the fusing ability of the powders is not substantially impaired. Such thermoplastic resin powders are added to a solvent together with an organic polymer. It is however necessary to use thermoplastic resin powders which do not dissolve into the solvent completely.

The thermoplastic resin powders are used in an amount of 20 to 70% by weight, based on the weight of the organic polymer. When the amount is less than 20% by weight, the powders will play the role as a binder only insufficiently, whereas when it exceeds 70% by weight, there may result an undesirably low fuel-trapping capacity owing to excessive presence of the thermoplastic resin powders. It is preferable to use thermoplastic resin powders having a grain size of 0.01 to 2,000 μm. It is preferable to use a crosslinking agent that is capable of crosslinking the organic polymer having the function of trapping fuel, but is incapable of crosslinking the thermoplastic resin used as a binder.

If desired, crosslinking aids can be used in combination with crosslinking agents to promote the reaction.

Crosslinking agents can be used in an amount of 1 to 20 wt %, and crosslinking aids in an amount of 0 to 20 wt %, both based on the weight of the polymer.

It can be preferable to remove oxygen from the solution of the organic polymer before it is subjected to the reaction. For example, nitrogen gas can be bubbled into a solution of the polymer. Alternatively, a container containing the polymer solution may be repeatedly evacuated and filled with nitrogen gas. By such operations, oxygen gas dissolved in the solution can be removed therefrom.

In the case of suspension polymerization or emulsion polymerization, the reaction can be carried out in the manner set forth below, using a dispersant-containing solution.

At first, a solution containing an organic polymer and a crosslinking agent is added with stirring to a solution containing a dispersant. Then, the resulting suspension is stirred until the crosslinking agent is decomposed almost completely, thus allowing the reaction of the organic polymer to proceed in the presence of a dispersant.

Examples of usable dispersants include polyvinyl alcohols (PVA), gelatin, tragacanth gum, gum arabic, starch, methyl celluloses, carboxymethyl celluloses, polyacrylates, alkaline soaps, organic amino soaps, sulfates of higher alcohols, synthetic surface active agents, such as nonionic surfactants (e.g., Tweens), proteins, vegetable gums, alginates, saponin, and the like.

It can be preferable to subject the dispersant-containing solution to deoxidation prior to the reaction, as in the case of the polymer solution. In usual cases, water is used as solvent for the dispersant-containing solution. Dispersant may be contained in the solution at a concentration of ca. 1 to 5 wt %.

After the completion of the reaction, the reaction mixture is cooled to allow it to separate into two phases: a polymer layer and an aqueous layer. Then the polymer layer (upper layer) is separated to collect a creamy paste of polymer gel. The polymer gel contain fine polymer particles having grain size of 10 to 100 μm; the thermoplastic resin powders as binders which are attached to, and admixed with, the particles; the solvent; the dispersant; etc.

Figure 15:
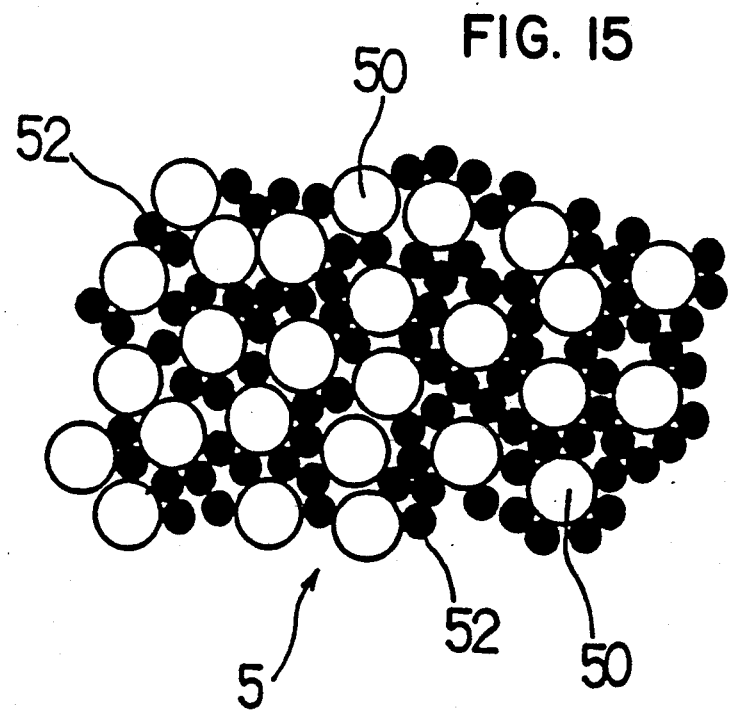
FIG. 15 is a schematic illustration showing the state bonded fine polymer particles in the fuel absorbent according to Example 19.

Thereafter, the polymer gel containing the fine polymer particles and the thermoplastic resin powders are granulated by a granulator, such as a high speed mixer or a spray drier, to give intermediate granules having a grain size of ca. 1 to 5 mm. In the granules so produced, the fine polymer particles are mutually bonded in a non-tight state with the thermoplastic resin powders which are present around, and attached to, the fine polymer particles (See. FIG. 15).

The intermediate granules are then heated to a temperature at which the thermoplastic resin powders fuse (for example, 140° to 150° C. in the case of PE). During the heating, the thermoplastic resin powders, which are present around the fine polymer particles, fuse and adhere mutually, thus forming a physically strong fuel absorbent (see FIG. 15).

Figure 16:
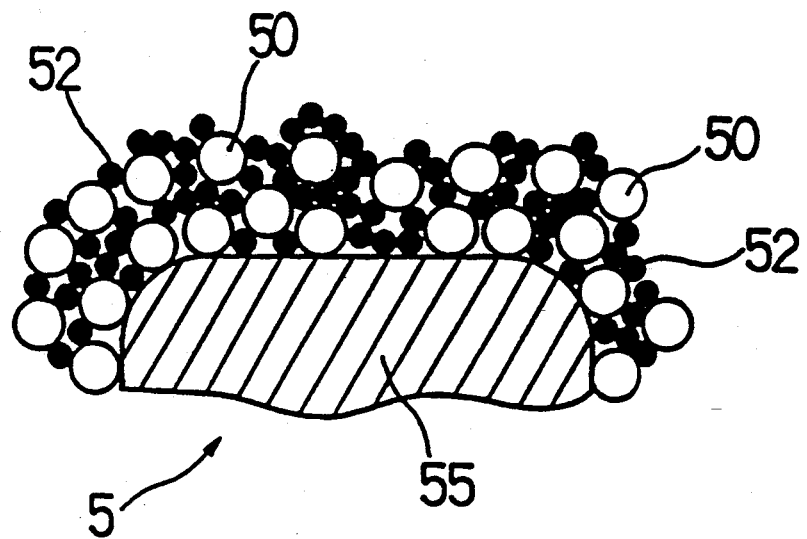
FIG. 16 is a schematic illustration showing the state of fine polymer particles in the supported fuel absorbent according to Example 21.

The thermoplastic resin powders contained in the resulting fuel absorbent are bonded by means of thermal fusion. The bonding strength of the powders can be stronger than that of ordinary adhesive binders. In addition, the powders are present uniformly on the surface of the fine polymer particles since they are subjected to thermal fusion after being admixed uniformly with the fine polymer particles in a hardly soluble solvent. The bonding power can therefore be uniform throughout the fuel absorbent, and hence there is less danger that the absorbent will be broken at a weakly bonded part. Further, the fuel absorbent has a porous structure as shown in FIGS. 15 and 16 and hence can absorb fuel in a highly efficient manner.

On the other hand, in the case of solution polymerization, a crosslinking agent is added to a solution of the organic polymer, and then the reaction of the polymer is carried out, without using any dispersant. By this reaction, there can be obtained a polymer gel in which the thermoplastic resin powders are dispersed. The polymer gel formed is subjected to granulation in the manner as described above, to give intermediate granules, which are then heated to a temperature at which the powders can adhere through thermal fusion.

In a modification of the present process, the thermoplastic resin powders are admixed with a polymer gel of fine polymer particles, instead of being added to a solution of the organic polymer prior to its reaction, and the resulting mixture is subjected to granulation and heating. In this case, the reaction of the organic polymer is performed by means of suspension polymerization or emulsion polymerization.

Accordingly, there is also provided by the present invention a process for producing a fuel absorbent, which comprises dissolving an organic polymer having the function of trapping fuel into a solvent; adding, while stirring, the resulting solution to a separately prepared solution containing a dispersant; allowing the organic polymer to react in the presence of a crosslinking agent, to form a polymer gel of fine polymer particles, collecting, after the completion of the reaction, the polymer gel formed; subjecting the resulting resin powder-containing gel to granulation, to obtain intermediate granules; and then heating the granules to a temperature at which said thermoplastic resin powders fuse and adhere mutually.

It is also possible to produce a fuel absorbent supported by a carrier, by coating on a carrier a polymer gel containing thermoplastic resin powders (for example, a thermoplastic resin powder-containing gel produced by either of the processes described hereinabove).

To be more specific, a polymer gel containing fine polymer particles and thermoplastic resin powders can be coated in a carrier and then dried, to give an intermediate product in which a large number of fine polymer particles are weakly bonded with thermoplastic resin powders and attached on the surface of the carrier. The intermediate product is then heated to the fusing temperature of the thermoplastic resin powders or a temperature higher than that. By this procedure, there can be obtained a supported fuel absorbent comprising fine polymer particles bonded to a carrier with fused thermoplastic resin powders.

A supported fuel absorbent can also be produced in the same manner, by using a mixture of a polymer gel prepared by solution polymerization, and thermoplastic resin powders.

Examples of usable carriers include granules, plates, cloths and threads, which may be made of plastics, ceramics, metals, or the like. The coating may be carried out by dipping the carrier into a thermoplastic resin powder-containing polymer gel. Alternatively, such a gel, if desired after being diluted with water or other solvents, can be coated on a carrier, by using, e.g., a spray gun. It is also possible to coat such a gel by using a roll coater.

The granular fuel absorbent obtained as above can be shaped into any desired form, including, e.g., honeycombs, plates, and films.

The shape of the fuel absorbent supported by a carrier is basically identical with that of the carrier used. The absorbent however can also be shaped into any desired form, including honeycombs and plates. The thickness or diameter of such a fuel absorbent is preferably within the above limit.

The fuel absorbent according to the present invention does not dissolve in fuel and only swells by trapping (or absorbing) evaporated fuel. The absorbent can therefore be regenerated by purging (or eliminating) the trapped fuel, and be used repeatedly.

The fuel absorbent according to the invention can be used not only in automobile canisters, but in any other evaporation loss control devices, including those to be applied to fuel tanks of boilers.

The fuel absorbent produced in accordance with this process is highly capable of trapping fuel. This is because the organic polymers used as a base material have power to swell to a considerable extent through absorption fuel, such as gasoline, due to its strong affinity for evaporated fuel.

The fuel absorbent according to the invention has an increased physical strength as a whole since the fine polymer particles are mutually bonded with the thermoplastic resin powders. The absorbent can therefore be highly excellent in its durability against the absorption-desorption cycle, i.e., repeated trapping and releasing of fuel.

In the fuel absorbent, thermoplastic resin powders are used as a binder. It is therefore possible to adhere the binder uniformly on the surface of the fine polymer particle. In addition, such a binder can be admixed quite easily.

Moreover, in the fuel absorbent according to the invention, the organic polymers are chemically bonded to each other, and hence the resultant fuel absorbent has a three-dimensional structure. Because of this, the absorbent can be highly flexible as a whole and exhibits a highly enhanced fuel trapping capability.

In the case where the absorbent is supported by a carrier, it has a markedly enhanced physical strength as a whole since the carrier functions as a skeleton. In addition, the absorbent has a large surface area for the volume of fine polymer particles used since the particles are positioned on the surface of the carrier. The unit volume capacity of the absorbent to absorb fuel can therefore be quite high.

When the fuel absorbent has swelled through absorption of fuel, the evaporation loss control device containing the same can be subjected to purging to release the trapped fuel. The absorbent recovers its fuel trapping ability through the purging and can therefore be used repeatedly.

As described hereinabove, there can be provided a process for producing a fuel absorbent which is excellent not only in durability against the absorption-desorption cycle, but in the ability of trapping fuel.

As the fifth aspect of this invention, there is provided a process for producing a fuel absorbent supported by a carrier, comprising the steps of: dissolving an organic polymer having the function of trapping fuel into a solvent; adding to the resulting solution a binder of thermoplastic resin powders; allowing the organic polymer to react in the presence of a crosslinking agent, to form a thermoplastic resin powder-containing polymer gel; collecting, after the completion of the reaction, the polymer gel formed; coating the polymer gel onto a thermoplastic carrier; drying the coated product; and heating the dried product at a temperature at which said thermoplastic resin powders and the surface region of said thermoplastic carrier fuse and adhere mutually.

By "organic polymer having the function of trapping fuel" is herein meant an organic polymer that is capable of trapping evaporated fuel (and leaked fuel liquid, too) and can be crosslinked to at least such a level where a gel is formed. By the phrase "function of trapping" is herein meant the capability of absorbing fuel or of being swollen by fuel.

The phrase "to allow the polymer to react" herein means to allow the organic polymer to undergo any chemical reactions, including crosslinking and polymerization. Such reactions may be allowed to proceed in any form, including, e.g., suspension polymerization, emulsion polymerization and solution polymerization. As is shown hereinbelow, there can be obtained gel of fine polymer particles by suspension polymerization or emulsion polymerization, and a polymeric gel in the case of emulsion polymerization.

The organic polymer and the solvent are used preferably in the following ratio: organic polymer, 2 to 30 wt %; solvent, 70 to 98 wt %.

Examples of thermoplastic resin powders usable as a binder include such crystalline polymers as PP, PE, PBT, PET, POM and nylon. As is explained hereinbelow, such thermoplastic resin powders are used as a binder for mutually adhering intermediate granules through their fusion. The resin does not participate in said reaction of the organic polymer. It undergoes crosslinking not at all or only to such an extent that the fusing ability of the powders is not substantially impaired. Such thermoplastic resin powders are added to a solvent together with an organic polymer. It is however necessary to use thermoplastic resin powders which do not dissolve into the solvent completely.

The thermoplastic resin powders are used in an amount of 20 to 70% by weight, based on the weight of the organic polymer. When the amount is less than 20% by weight, the powders will play the role as a binder only insufficiently, whereas when it exceeds 70% by weight, there may result undesirably low fuel-trapping capacity owing to excessive presence of the thermoplastic resin powders. It is preferable to use thermoplastic resin powders having a grain size of 0.01 to 1,000 $\mu$m. It is preferable to use a crosslinking agent that is capable of crosslinking the organic polymer having the function of trapping fuel, but incapable of crosslinking the thermoplastic resin used as a binder.

Crosslinking agents can be used in an amount of 1 to 20 wt %, and crosslinking aids in an amount of 0 to 20 wt %, both based on the weight of the polymer.

It can be preferable to remove oxygen from the solution of the organic polymer before it is subjected to the reaction. For example, nitrogen gas can be bubbled into a solution of the polymer. Alternatively, a container containing the polymer solution may be repeatedly evacuated and filled with nitrogen gas. By such operations, oxygen gas dissolved in the solution can be removed therefrom.

In the case of suspension polymerization or emulsion polymerization, the reaction can be carried out in the manner set forth below, using a dispersant-containing solution.

At first, a solution containing an organic polymer and a crosslinking agent is added with stirring and heating to a solution containing a dispersant. Then, the reaction is allowed to proceed by heating and stirring the resulting suspension until the crosslinking agent is decomposed almost completely.

Examples of usable dispersant include polyvinyl alcohols (PVA), gelatin, tragacanth gum, gum arabic, starch, methyl celluloses, carboxymethyl celluloses, polyacrylates, alkaline soaps, organic amino soaps, sulfates of higher alcohols, synthetic surface active agents, such as nonionic surfactants (e.g., Tweens), proteins, vegetable gums, alginates, saponin, and the like.

It can be preferable to subject the dispersant-containing solution to deoxidation prior to the reaction, as in the case of the polymer solution. In usual cases, water is used as a solvent for the dispersant-containing solution. Dispersant may be contained in the solution at a concentration of ca. 1 to 5 wt %.

After the completion of the reaction, the reaction mixture is cooled and allowed to separate into two layers: a polymer layer and an aqueous layer. Then the polymer layer (upper layer) is separated to collect a creamy paste of polymer gel. The polymer gel contains fine polymer particles having a grain size of 10 to 100 $\mu$m, and thermoplastic resin powders as a binder, together with the solvent and the dispersant.

Then, the polymer gel containing thermoplastic resin powders and fine polymer particles is coated on the surface of a thermoplastic carrier and then dried, to give an intermediate product in which a large number of fine polymer particles are bonded with the thermoplastic resin powders in a non-tight state and, at the same time, the particles and the powders are attached to the surface of the thermoplastic carrier.

The intermediate product is then heated at a temperature equal to, or higher than, the fusing (or melting) temperature of the thermoplastic resin powders and, at the same time, equal to, or higher than, the fusing (or melting) temperature of the surface of the thermoplastic carrier. According to this procedure, there can be obtained a supported fuel absorbent in which thermoplastic resin powders are fused and adhered mutually to bind a large number of fine polymer particles and, at the same time, to adhere to the thermoplastic carrier.

The fuel absorbent has the structure in which the carrier and the binder are mutually adhere to each other through thermal fusion. Because of this, the fuel absorbent can be highly resistant against impact. Moreover, the carrier can be tough and hardly breakable since it consists of a thermoplastic resin, which is usually flexible by its nature.

Figure 17:
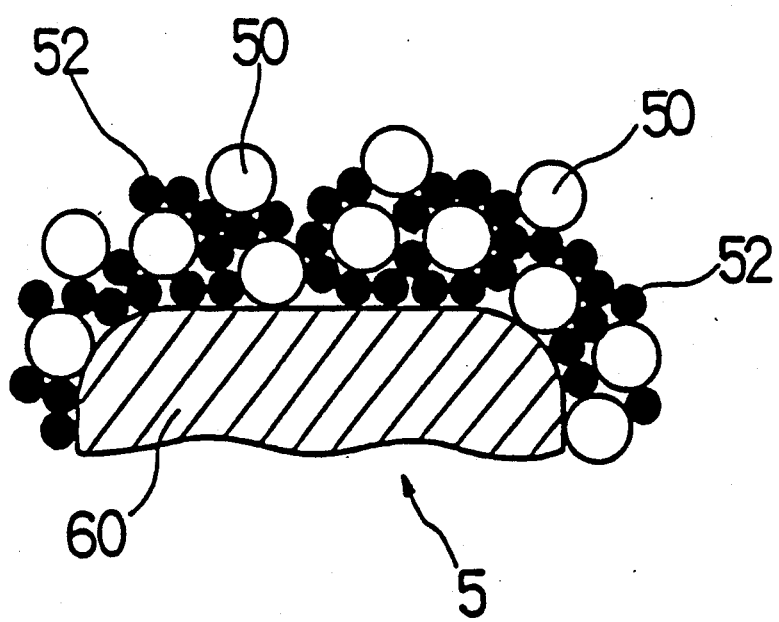
FIG. 17 is a schematic illustration showing the state of bonded fine polymer particles in the supported fuel absorbent according to Example 24.
Figure 18:
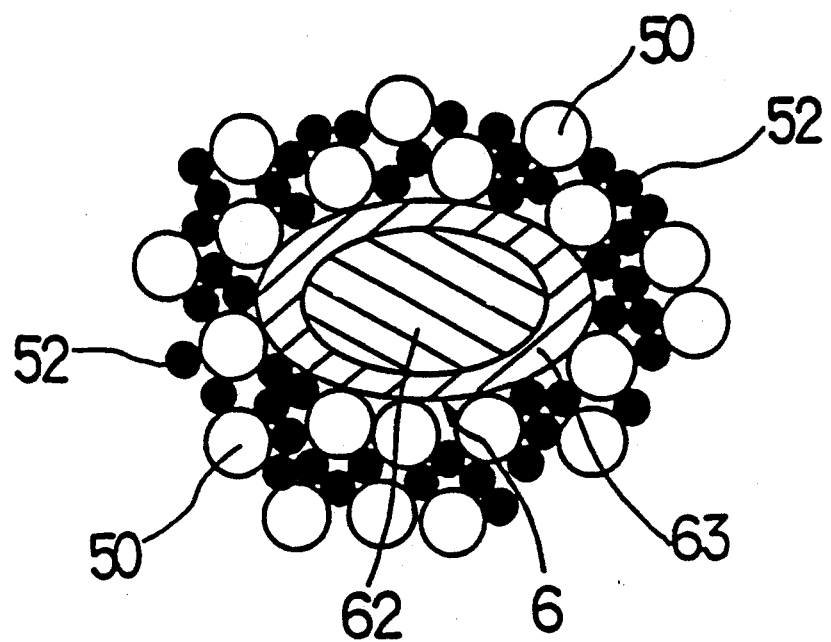
FIG. 18 is a schematic illustration showing the state of bonded fine polymer particles in the supported fuel absorbent according to Example 25.

In addition, as shown in FIGS. 17 and 18, the fine polymer particles 50 form a porous structure with the binder and hence exhibit an improved permeability and an enhanced efficiency of trapping fuel.

On the other hand, in the case of solution polymerization, a crosslinking agent is added to a solution of an organic polymer, and then the reaction is carried out without using any dispersant. By this reaction, there can be obtained a polymer gel in which the thermoplastic resin powders are dispersed. The thus formed polymer gel is coated on a carrier and subjected to drying and heating in the same manner as above.

The thermoplastic carrier can be in the form of, e.g., granules, plates, cloths, nets, or threads. The carrier can be made of, e.g., such crystalline thermoplastic resins as PP, PE, PBT, PET, POM and nylon.

It can be preferable to use a thermoplastic carrier consisting of a material identical with the one used for the thermoplastic resin powders, or a material having a fusing temperature equal, or close, to that of the thermoplastic resin powders.

It is possible to use a thermoplastic carrier comprising a core, and a surface layer consisting, e.g., of such crystalline thermoplastic resins as those described hereinabove. In such a case, the core is preferably made of a resin having a melting point higher than that of the surface layer. Examples of resins usable for the core include thermoplastic resins, such as PE, PP, PBT, PET, POM, nylon, polyimides, polysulfones, polyethersulfones, polyamidoimides, polyphenylene oxides, PPS (polyphenylene sulfide), etc.; and thermosetting resins of, e.g., phenol, melamine, epoxy, polyimide, urea, polyester, diallylphthalate, silicone or polyurethane series. It is also possible to use metals or ceramics.

The coating of the polymer gel can be carried out by dipping a thermoplastic carrier into the gel. Alternatively, such a gel, if desired after being diluted with water or another solvent, can be coated on a thermoplastic carrier by using, e.g., a spray gun. It is also possible to coat such gel by using a roll coater.

In a modification of the present process, the thermoplastic resin powders are admixed with a polymer gel of fine polymer particles, instead of being added to a solution of an organic polymer at the initial stage of the process, and the resulting mixture is coated on a thermoplastic carrier and then subjected to granulation and heating in the same manner as above. In this case, the reaction of the organic polymer is performed by means of suspension polymerization or emulsion polymerization.

Accordingly, a fuel absorbent supported by a carrier can also be produced by a process which comprises dissolving an organic polymer having the function of trapping fuel; adding, while stirring, the resulting solution to a separately prepared solution containing a dispersant; reacting the organic polymer in the presence of a crosslinking agent, to form a polymer gel of fine polymer particles; collecting, after the completion of the reaction, the polymer gel; adding thermoplastic resin powders to the polymer gel; coating the resulting mixture on a thermoplastic carrier; drying the coated product; and heating the dried product at a fusing temperature as described hereinabove.

The shape of the fuel absorbent obtainable as above is basically identical with that of the carrier used. The absorbent can be shaped into any desired form, including, e.g., honeycombs, plates, and films.

The fuel absorbent according to this process does not dissolve in fuel and only swells by trapping (absorbing) evaporated fuel. The absorbent can therefore be regenerated by purging (or eliminating) the trapped fuel, and used repeatedly.

The fuel absorbent according to this process can be used not only in automobile canisters, but in any other evaporation loss control devices, including those to be applied to fuel tanks of boilers.

The fuel absorbent produced in accordance with this process is highly capable of trapping fuel. This is because the organic polymers used as a base material have the power to swell to a considerable extent through absorption of fuel, such as gasoline, due to its strong affinity for evaporated fuel.

The physical absorbent according to the invention has an increased physical strength as a whole since the fine polymer particles are mutually bonded with the thermoplastic resin powders.

The carrier also contributes to the improvement of total strength of the absorbent as it plays a role as a skeleton. In addition, the fine polymer particles and the carrier can be strongly bonded with the thermoplastic powders and the thermoplastic resin present on the surface of the carrier.

The fuel absorbent can therefore be highly excellent in its durability against the absorption-desorption cycle, i.e., repeated trapping and releasing of fuel.

In the fuel absorbent, thermoplastic resin powders are used as a binder. It is therefore possible to make the binder adhere uniformly on the surface of the fine polymer particles. In addition, the binder can be admixed quite easily.

In the fuel absorbent, the organic polymers are chemically bonded to each other, and hence the resulting fuel absorbent has a three-dimensional structure. Because of this, the absorbent can be highly flexible as a whole and exhibits a highly enhanced fuel trapping capability.

The fuel absorbent has a large surface area for the volume of the fine polymer particles since the particles are contained in a layer positioned on the surface of the carrier. Accordingly, the absorbent can be outstanding in its capability for trapping fuel, per unit volume of the fine polymer particles.

When the fuel absorbent has swelled through absorption of fuel, the evaporation loss control device containing the same can be subjected to purging to release the trapped fuel. The absorbent recovers its fuel trapping ability through the purging and can therefore be used repeatedly.

As described hereinabove, there can be provided a process for producing a fuel absorbent which is excellent not only in durability against the absorption-desorption cycle, but in the ability of trapping fuel.

EXAMPLES

In the following examples, parts and percentages are based on weight, unless otherwise specifically stated.

EXAMPLE 1 (THE FIRST ASPECT)

A fuel absorbent was produced in the following manner.

In the first place, a 10% solution of ethylene-propylene-thylidenenorbornene copolymer (EP-33, manufactured by Japan Synthetic Rubber Co.) as an organic polymer having the function of trapping fuel in toluene was prepared (weight of the solution: 800 g).

Subsequently, benzoyl peroxide as a crosslinking agent was added to the solution, whereby the crosslinking agent was used in an amount of 20 parts (reduced to pure product), per 100 parts of the copolymer. Divinylbenzene as a crosslinking aid was then added to the resulting solution, whereby the crosslinking aid was used in an amount of 20 parts, per 100 parts of the copolymer. Nitrogen gas was then bubbled into the thus prepared polymer solution as a deoxidation treatment to remove oxygen dissolved therein.

On the other hand, 2200 g of aqueous 1% solution of polyvinyl alcohol (PVA) as a dispersant having a polymerization degree of 500 and a saponification degree of 86.5 to 89 mol % was placed in a pressure vessel. A high power stirrer was fitted at the top of the vessel, and the vessel was sealed. The vessel was evacuated and then filled with nitrogen gas. This deoxidation treatment was repeated three times to remove oxygen dissolved in the solution.

Thereafter, the deoxidized copolymer solution prepared above was poured with vigorous agitation into the deoxidized PVA solution contained in the pressure vessel, to form a dispersion. After the completion of the pouring, the pressure vessel was subjected to the same deoxidation treatment as above, and the contents were stirred for an additional 15 minutes.

The stirrer was replaced with a conventional propeller stirrer, and the reaction mixture contained in the vessel was stirred at 120 to 300 r.p.m., during which the temperature of the mixture was raised to 92° C. The resulting mixture was stirred for an additional 6 hours, and then a 20% solution of an antioxidant as a polymerization inhibitor in toluene was added to the reaction mixture to terminate the reaction.

After the completion of the reaction, the pressure vessel was cooled with ice water and then allowed to stand at room temperature for 3 hours, during which the reaction mixture separated into two phases: the upper creamy layer of fine polymer gel particles and the lower aqueous layer. The polymer gel particles were then collected.

The polymer gel particles (not subjected to washing) were added in small portions into a high speed mixer which performs the drying and granulation of the particles. There was obtained a spherical fuel absorbent having a grain size of 1 to 3 mm (which is designated as Sample 1).

As is schematically shown in FIG. 1, the thus produced fuel absorbent is composed of fine polymer particles 50 generated by the crosslinking of the organic polymer, and PVA 52 which was used as dispersant and is present around, and attached to, the particles 50. In other words, the fuel absorbance 5 consists of fine polymer particles 50 bonded with PVA 52 that functions as a binder.

Figure 2:
FIG. 2 is a microphotograph taken by a scanning electron microscope, showing the structure of dried fine polymer particles according to Example 1.

Microphotographs (magnification: 200×) of the dried particles were taken with a scanning electron microscope. A microphotograph so obtained is shown in FIG. 2, in which the spheres show dried fine polymer particles. It can be seen that the surface of the fine polymer particles is covered with PVA.

EXAMPLE 2 (THE FIRST ASPECT)

One hundred grams (100 g) of the creamy fine polymer gel particles prepared in Example 1 was collected and washed with 0.2 liters of water of 60° C. to give fine polymer gel particles on which part of the PVA used still remained. The resulting particles were dried and granulated in the same manner as in Example 1 to give a fuel absorbent (which is designated as Sample 2).

Figure 3:
FIG. 3 is a similar microphotograph of dried fine polymer particles according to Example 2.

In FIG. 3 is shown a microphotograph of the dried fine polymer gel particles taken in the same manner as in Example 1. The photograph shows that PVA remains on, and is attached to, some parts of the surface of the polymer particles, and is present in spaces between the fine polymer particles.

EXAMPLE 3 (THE FIRST ASPECT)

One hundred grams (100 g) of the creamy fine polymer gel particles prepared in Example 1 was collected and washed with 0.4 liters of isopropyl alcohol (which does not dissolve the dispersant). The crosslinking agent, the crosslinking aid and unreacted polymer were washed away during the course of the washing, whereas the PVA used as dispersant remained on the surface of the fine polymer particles.

Then, the resulting particles were dried and granulated in the same manner as in Example 1 to give a fuel absorbent (which is designated as Sample 3).

The surface of the washed and dried fine polymer particles was covered with PVA.

EXAMPLE 4 (THE FIRST ASPECT)

In this example, a reactive substance was coated on the surface of the fuel absorbent prepared in Example 1. In the first place, a urethane adhesive (a mixture of 100 parts of Nipporan 3124 and 10 parts of Collonate L, both manufactured by Japan Polyurethane Ind. Co.) as a reactive substance was dissolved into toluene to form a homogenous 20% solution. Into this solution was then immersed the fuel absorbent prepared in Example 1. After having been immersed for 2 minutes, the absorbent was taken out, and the polyurethane adhesive present on the surface of the absorbent was cured by allowing the immersed absorbent to stand for 70 hours in a thermostat maintained at 60° C. with circulation of hot air.

There was obtained a fuel absorbent coated with the reactive substance (which is designated as Sample 4).

Figure 4:
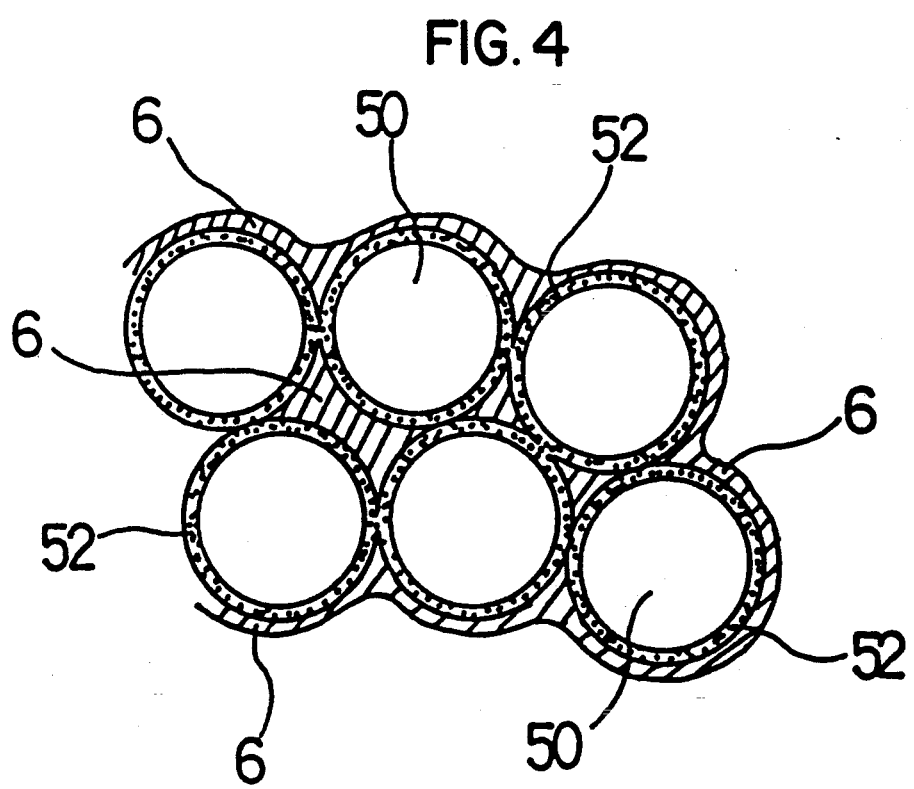
FIG. 4 is a schematic illustration showing the state of coated particles according to Example 4.

As is schematically shown in FIG. 4, the coated fuel absorbent was composed of the main elements of fine polymer particles 50 bonded with PVA 52, and the coating layer 6 covering the main elements.

Figure 5:
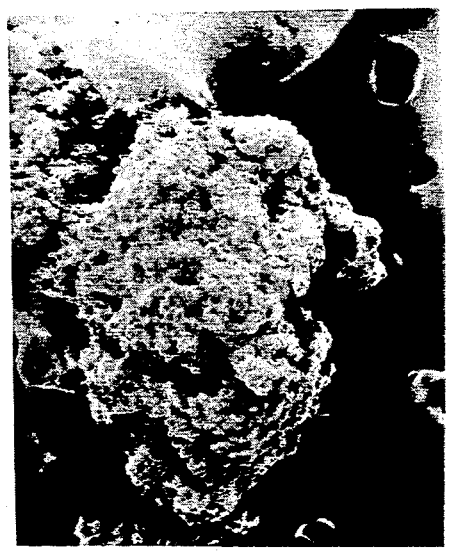
FIGS. 5 and 6 are microphotographs of fuel absorbent according to Example 4, showing its grain structure before being coated (FIG. 5) or after being coated (FIG. 6).
Figure 6:

In FIG. 5 is shown a microphotograph (magnification: 60×) of particles of the fuel absorbent taken prior to the coating of the coating layer 6 in the same manner as in Example 1. In FIG. 6 is shown a microphotograph (magnification: 60×) which shows the state of particles in the fuel absorbent covered with the coating.

As would be seen from FIG. 5, the fuel absorbent not provided with the coating is in the form of granules (grain size: 1 to 3 mm) composed of fine polymer particles (grain size: 1 to 50 μm) bonded with PVA. On the other hand, in the coated fuel absorbent, the granules are covered with the coating of the reactive substance, as is shown in FIG. 6.

EXAMPLE 5 (THE FIRST ASPECT)

The fuel absorbent prepared in Example 2 was subjected to the same coating treatment as in Example 4 to give a coated fuel absorbent (which is designated as Sample 5).

EXAMPLE 6 (THE FIRST ASPECT)

The fuel absorbent prepared in Example 3 was subjected to the same coating treatment as in Example 4 to give a coated fuel absorbent (which is designated as Sample 6).

EXAMPLE 7 (THE FIRST ASPECT)

Properties of Samples 1 to 6 prepared in Examples 1 to 6 were determined in the following manner.

Durability Against Absorption-Desorption Cycle

A sample of fuel absorbent contained in a 100 mesh stainless steel wire-gauze container is immersed into toluene for 24 hours. Immediately after being taken out of the solvent, the absorbent is subjected to a load test, wherein loads are applied thereon downwardly, and the weight of load (gf) at its break is determined.

Capacity for Trapping Fuel

Each sample of fuel absorbent (weight: ca. 0.2 g) is placed in a stainless steel wire-gauze container (weight: V), and the total weight (W) of the sample and the container is weighed. The container, together with the sample, is immersed into toluene as a fuel and is taken out of the fuel after the lapse of time shown in Table 1, and the total weight (Y) of the container and the sample is weighed each time the container and the sample are taken out. The rate of absorption (%) of the absorbent is calculated in accordance with the following equation:

$$\text{Absorption (\%)} = \frac{Y - W}{W - V} \times 100$$

Results obtained are shown in Table 1.

For the purpose of comparison, the creamy fine polymer gel particles prepared in Example 1 were collected and washed thoroughly with warm water, up to a state no PVA remained thereon. The resulting particles were dried and granulated in the same manner as in Example 1 to give a fuel adsorbent (which is designated as Sample C1). Properties of the sample were then determined in the manner as described above. Results obtained are shown in Table 1.

It would be understood from the table 1 that the fuel absorbents according to the present invention (Samples 1 to 6) are higher in load at break (gf) than the comparative sample (Sample C1). This is because the fine polymer particles constituting the fuel absorbents according to the invention are bonded with PVA or dispersant and hence the absorbents as a whole can be physically stronger than the comparative sample.

It would also be understood that the physical strength of Sample 2 is a little inferior to that of Sample 1 or 3 since the amount of PVA used in Sample 2 is smaller than in Samples 1 and 3, and that Samples 4 to 6, which were prepared by applying a coating to Samples 1 to 3, have a markedly improved physical strength, compared with Samples 1 to 3, which were not provided with a coating.

The fuel absorbents according to the present invention are therefore excellent in their durability against repeated absorption and desorption of fuel, as well as in their capacity or trapping or absorbing fuel.

On the other hand, the comparative sample (Sample C1), although its absorbing capacity is quite high, is fairly inferior in load at break at the time when it has absorbed fuel since the PVA used as a dispersant during its production was washed away and the fine polymer particles constituting the sample are not bonded with PVA. Such an absorbent is therefore poor in durability against the repetition of the absorption-desorption cycle.

TABLE 1

| | | Properties of the Samples | | | | |
|---|---|---|---|---|---|---|
| | Characteristic | Load at | Rate of Absorption (%) | | | |
| Sample | Treatment | Break (gf) | After 1 min. | After 5 min. | After 10 min. | After 60 min. |
| 1 | Not washed | 50–80 | 410 | 680 | 800 | 960 |
| 2 | Partially washed with warm water | 25–35 | 600 | 850 | 990 | 1,100 |
| 3 | Washed with solvent not dissolving dispersant | 40–70 | 530 | 730 | 880 | 990 |
| 4 | Not washed, but coated | 200–400 | 100 | 200 | 300 | 560 |
| 5 | Partially washed with warm water and coated | 100–200 | 200 | 300 | 430 | 730 |
| 6 | Washed with solvent not dissolving dispersant and coated | 150–300 | 150 | 230 | 340 | 630 |
| C1 | Completely washed with warm water (Comparative Sample) | 10–20 | 850 | 1,050 | 1,100 | 1,200 |

EXAMPLE 8 (THE FIRST ASPECT)

In this example, explanation will be given on an automobile canister to which the fuel absorbent according to the invention is applied.

As is shown in FIG. 7A, the fuel absorbent 20 is placed in an absorption chamber 2 formed in the interior of the housing body 10 of a canister 1.

The housing body 10 is cylindrical, and is provided with a lid 11 at its upper end and with a bottom plate 12 at its lower end. The lid 11 is provided with a purging pipe 16, and the first and second introduction pipes 13 and 14 with their ends 141 projected into the interior of the absorption chamber 2.

The first introduction pipe 13 is connected to the upper space of a carburetor's float chamber 81, and the second introduction pipe 14 is connected to a fuel tank 82. The purging pipe 16 is connected to a purging port 85. The bottom plate 12 has an opening for a purging air pipe 15. The pipes 13, 14, 15 and 16 are fitted with valves 131, 142, 151 and 161, respectively.

A perforated plate 17 is positioned at the lower end of the absorption chamber 2, and another perforated plate 18 at the upper end of the chamber. The perforated plate 17 is pushed upwardly by a spring 101, and the perforated plate 18 is pushed downwardly by a spring 102. In the system shown in FIG. 7A, gasoline 8 is used as fuel.

Gasoline vapor evaporated in the carburetor's float chamber 81 or in the fuel tank 82 flows, via the first and second introduction pipes 13 and 14, into the absorption chamber 2, where it comes into contact with the fuel absorbent 20 and is absorbed. During the period of absorption, the valves 131 and 142 fitted at the introduction pipes 13 and 14 are open, and the valve 161 of the purging pipe 16 and the valve 151 of the purging air pipe 15 are closed.

In the course of absorption, the fuel absorbent 20 swells through trapping of gasoline vapor.

After having absorbed a large quantity of gasoline vapor, the absorbent can be regenerated. If desired, the absorbent, after being used for a long period of time with repeated regeneration, can be replaced with a fresh one by detaching the lid 11 from the housing body 10.

Regeneration of the absorbent can be performed by introducing air through the purging air pipe 15, with valves 131, 142, 151 and 161 reversed. The exhaust gas is discharged into the purging port 85 via the purging pipe 16. During the purging step, the air introduced into the canister plays an important role in the releasing and discharging of gasoline vapor absorbed by the fuel absorbent.

Figure 7B:
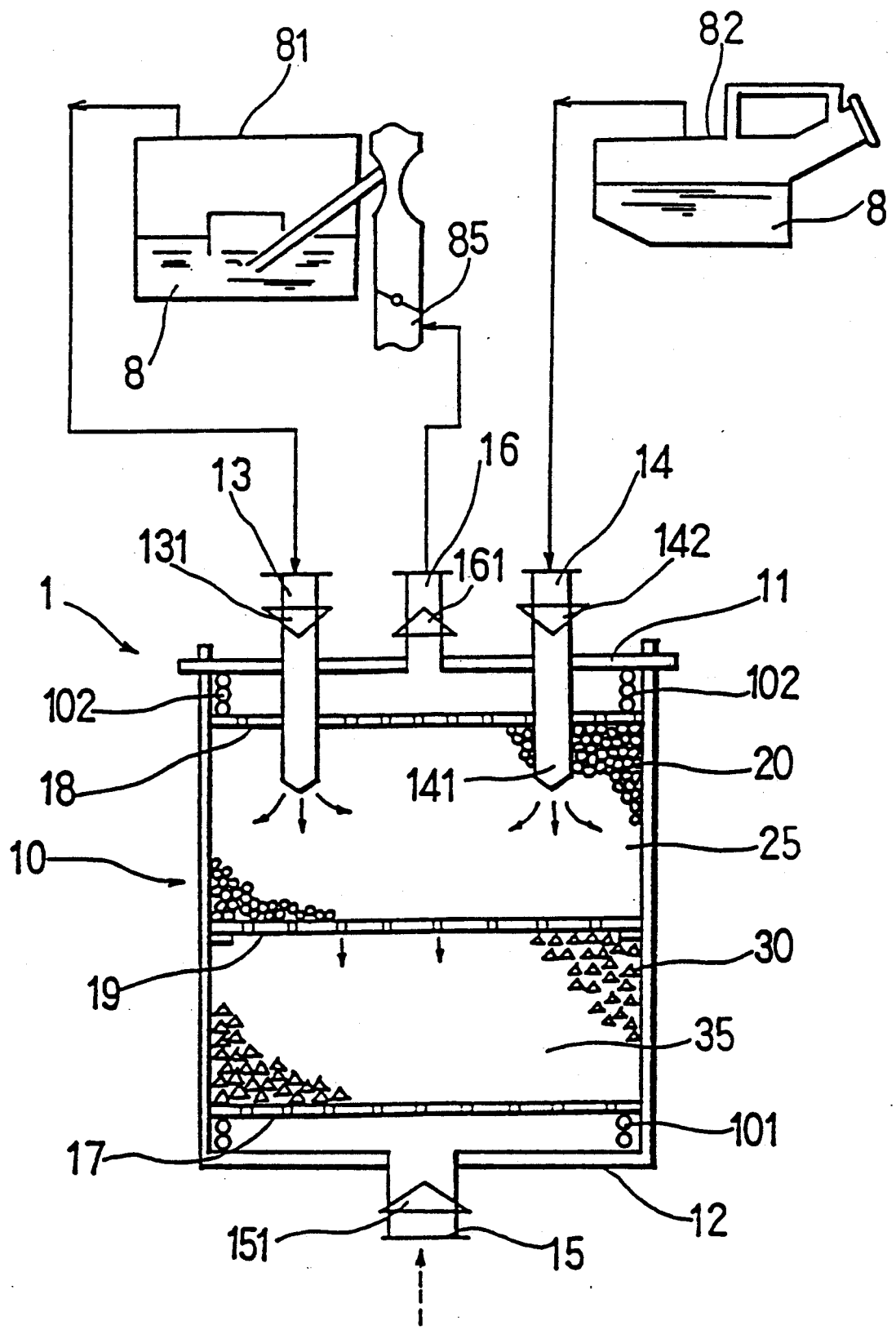

Another type of canister used in this example is shown in FIG. 7B. The canister 1 consists of a housing body 10, a fuel absorbent 20 produced by the present invention packed in the upper first compartment 25 of the vessel, and charcoal 30 packed in the lower second compartment 35.

The housing body 10 is cylindrical in shape and has a lid 11 and a bottom plate 12. To the lid 11 is fixed a first introduction pipe 13 having its end inserted into the first compartment 25 to extend close to its central portion, a second introduction pipe 14 having its end 141 inserted likewise into the first compartment 25, and a purging pipe 16. The first introduction pipe 13 communicates with the space above a carburetor's float chamber 81 whereas the second introduction pipe 14 communicates with a fuel tank 82. The purging pipe 16 communicates with a purging port 85. A purging air pipe 15 is open to the bottom plate 12. The pipes 13, 14, 15 and 16 are respectively equipped with valves 131, 142, 151 and 161. A perforated plate 17 is provided in the lower part of the housing body 10 and another perforated plate 18 is disposed in the upper part of the housing body. The first compartment 25 is partitioned from the second compartment 35 by a perforated plate 19 which is positioned generally intermediate between the perforated plates 17 and 18. Granular charcoal 30 is packed between the perforated plates 17 and 19, and a fuel absorbent 20 according to the present invention is packed between the perforated plates 19 and 18. The perforated plate 17 is urged upward by means of a spring 101 whereas the perforated plate 18 is urged downward by means of a spring 102. Gasoline is denoted by 8 in FIG. 7B.

Evaporated fuel is trapped with the canister 1 in the following way. Gasoline evaporates in the float chamber 81 or the fuel tank 82 and the resulting vapor gets into the first compartment 25 of the canister 1 through the first introduction pipe 13 or second introduction pipe 14. The vapor then makes contact with the fuel absorbent 20 in the first compartment 25 and is absorbed by it. The gasoline vapor that has not been absorbed by the fuel absorbent 20 is admitted into the second compartment 35 where it is absorbed by the charcoal 30. During this absorption step, the valves 131 and 142 on the pipes 13 and 14 are open whereas the valves 161 and 151 on the purging pipes 16 and 15 are closed. The fuel vapor is absorbed first by the fuel absorbent 20 as a result of its dissolving or swelling in the fuel, then by the absorbing action of the charcoal 30.

After the two absorbents have absorbed the gasoline vapor to saturation, the lid 11 is removed and the absorbents are replaced by fresh ones. Alternatively, the absorbents may be regenerated by feeding air through the purging air pipe 15 and discharging the exhaust gas into the purging port 85 through the pipe 16. In this purging step, the valves 161 and 151 are opened. The air fed into the canister permits the gasoline vapor to be detached from the fuel absorbent and the charcoal and subsequently discharged into the purging port 85.

The canister designed as above is capable of efficient trapping of gasoline vapor as evaporated fuel without causing deterioration in the working capacity of the charcoal.

As described hereinabove, the fuel absorbent is capable of trapping evaporated fuel vapor, such as gasoline, in a quite efficient manner and can be used repeatedly with repetition of the absorption-desorption cycle.

EXAMPLE 9 (THE SECOND ASPECT)

A fuel absorbent was produced in the following manner.

In the first place, a 10% solution of ethylene-propylene-ethylidenenorbornene copolymer (EP-33, manufactured by Japan Synthetic Rubber Co.) as an organic polymer having the function of trapping fuel in toluene was prepared (weight of the solution: 800 g).

Subsequently, benzoyl peroxide as a crosslinking agent was added to the solution, whereby the crosslinking agent was used in an amount of 20 parts (reduced to pure product), per 100 parts of the copolymer. Divinylbenzene as a crosslinking aid was then added to the resulting solution, whereby the crosslinking aid was used in an amount of 20 parts, per 100 parts of the copolymer. Nitrogen gas was then bubbled into the thus prepared polymer solution to remove oxygen dissolved therein as a deoxidation treatment.

On the other hand, 2,200 g of aqueous 1% solution of polyvinyl alcohol (PVA) as a dispersant having a polymerization degree of 500 and a saponification degree of 86.5 to 89 mol % was placed in a pressure vessel. A high power stirrer was fitted at the top of the vessel, and the vessel was sealed. The vessel was evacuated and then filled with nitrogen gas. This deoxidation treatment was repeated three times to remove oxygen dissolved in the solution.

Thereafter, the deoxidized copolymer solution prepared above was poured with vigorous agitation into the deoxidized PVA solution contained in the pressure vessel, to form a dispersion. After the completion of the pouring, the pressure vessel was subjected to the same deoxidation treatment as above, and the contents were stirred for an additional 15 minutes.

The stirrer was replaced with a conventional propeller stirrer, and the reaction mixture contained in the vessel was stirred at 120 to 300 r.p.m., during which the temperature of the mixture was raised to 92° C. The resulting mixture was stirred for an additional 6 hours, and then a 20% solution in toluene of an antioxidant as a polymerization inhibitor was added to the reaction mixture to terminate the reaction.

After the completion of the reaction, the pressure vessel was cooled with ice water and then allowed to stand at room temperature for 3 hours, during which the reaction mixture separated into two phases: the upper creamy layer of fine polymer gel particles and the lower aqueous layer. The polymer gel particles were then collected.

The fine polymer gel particles were coated, without being subjected to washing, on the surface of nylon fibers as a carrier of a diameter of ca. 0.5 mm. The coating was carried out by dipping the carrier into a bath of the creamy fine polymer gel particles. After the dipping, the carrier was taken out of the bath and air dried at room temperature to give a fibrous fuel absorbent of a diameter of ca. 0.7 mm (which is designated as Sample 7).

As is schematically shown in FIG. 9, the thus produced fuel absorbent is composed of fine polymer particles generated by the crosslinking of the organic polymer, PVA 52 used as a dispersant and present around the particles, and the carrier 55 bearing the particles and the dispersant. In other words, the fuel absorbent 5 consists of fine polymer particles 50 bonded to the surface of the carrier 55 with PVA 52 that functions as a binder.

Microphotographs (magnification: 94×) of the fine polymer particles present on the surface of the carrier were taken with a scanning electron microscope. A microphotograph so obtained is shown in FIG. 10, in which the fine spheres show dried fine polymer particles. It can be seen that the surface of the fine polymer particles is covered with PVA.

EXAMPLE 10 (THE SECOND ASPECT)

One hundred grams (100 g) of the creamy fine polymer gel particles prepared in Example 9 were collected and washed with 0.2 liters of water of 60° C. to give fine polymer gel particles on which part of the PVA used still remained. The resulting particles were coated on the same carrier as the one used in Example 9 and dried in the same manner to give a fuel absorbent (which is designated as Sample 8).

Microphotographs of the fuel absorbent were taken in the same manner as in Example 9 (not shown). The photographs showed that PVA was bonded to, and remained on, some parts of the surface of fine polymer particles, and was present in spaces between fine polymer particles.

EXAMPLE 11 (THE SECOND ASPECT)

One hundred grams (100 g) of the creamy fine polymer gel particles prepared in Example 9 were collected and washed with 0.4 liters of isopropyl alcohol (an alcohol not dissolving the dispersant). During the washing, the crosslinking agent, crosslinking aid and unreacted polymer were washed away, whereas the PVA used as dispersant remained on the surface of the fine polymer particles.

Then, the resulting particles were coated on the same carrier as the one used in Example 9 and dried in same manner to give a fuel absorbent (which is designated as Sample 9).

The surface of the fine polymer particles contained in the fuel absorbent were covered with PVA.

EXAMPLE 12 (THE SECOND ASPECT)

In this example, a reactive substance was coated on the fuel absorbent prepared in Example 9.

In the first place, a urethane adhesive (a mixture of 100 parts of Nipporan 3124 and 10 parts of Collonate L, both manufactured by Japan Polyurethane Ind. Co.) as a reactive substance was dissolved into toluene to prepare a homogeneous 20% solution.

Into this solution was immersed the fuel absorbent prepared in Example 9. After having been immersed for 2 minutes, the absorbent was taken out, and the polyurethane adhesive covering the surface of the absorbent was cured by allowing the immersed absorbent to stand for 70 hours in a thermostat maintained at 60° C. with circulation of hot air.

There was obtained a fuel absorbent coated with the reactive substance (which is designated as Sample 10).

Figure 11:
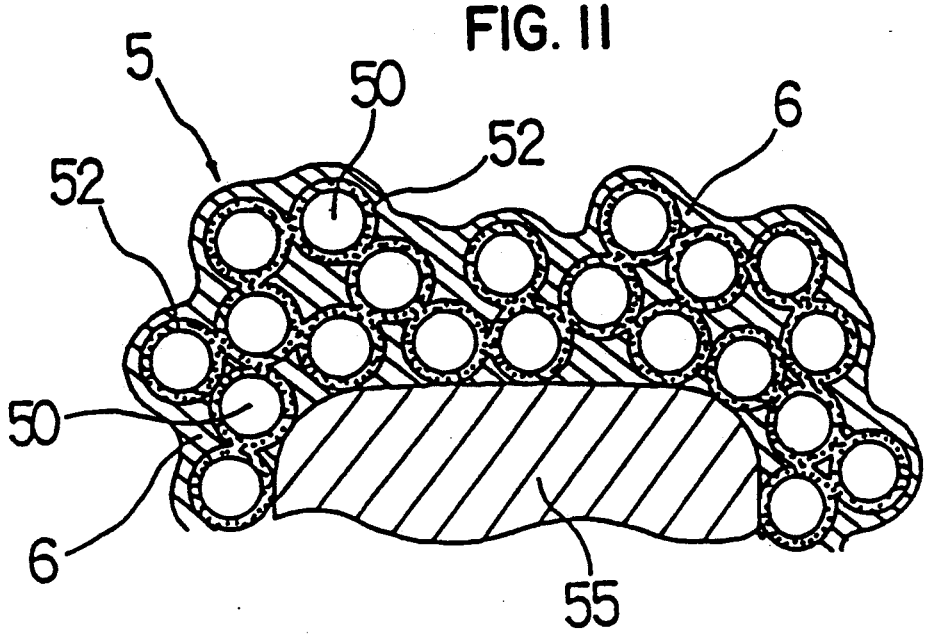
FIG. 11 is a schematic illustration showing the bonding state of the fine polymer articles in the fuel absorbent according to Example 12.

As is schematically shown in FIG. 11, the coated fuel absorbent has as its main elements fine polymer particles 50 mutually bonded with PVA 52, a coating layer 6 covering the main elements, and a carrier 55 bearing the main elements and the coating layer.

Figure 12:
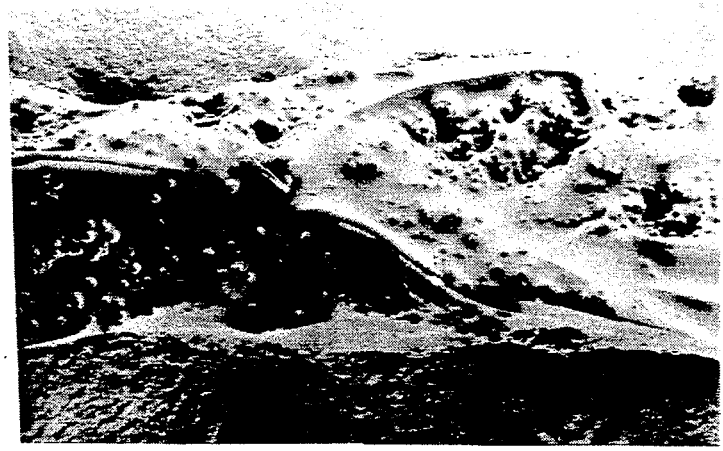
FIG. 12 is an electron scanning microphotograph showing the structure of particles in the coated fuel absorbent according to Example 12.

FIG. 12 is a microphotograph (magnification: 72×), which shows the state of particles present on the surface of the coated fuel absorbent.

In the coated fuel absorbent, as would be seen from FIG. 12, the fine polymer particles were covered with the coating of the reactive substance.

EXAMPLE 13 (THE SECOND ASPECT)

The fuel absorbent prepared in Example 10 was subjected to the same coating treatment as in Example 12 to give a coated fuel absorbent (which is designated as Sample 11).

EXAMPLE 14 (THE SECOND ASPECT)

The fuel absorbent prepared in Example 11 was subjected to the same coating treatment as in Example 12 to give a coated fuel absorbent (which is designated as Sample 12).

EXAMPLE 15 (THE SECOND ASPECT)

Properties of Samples 9 to 14 prepared in Examples 7 to 12 were determined in the same manner as in Example 7.

Results obtained are shown in Table 2.

For the purpose of comparison, the creamy fine polymer gel particles prepared in Example 9 were collected and washed thoroughly with warm water, up to a state no PVA remained thereon. The resulting particles were coated on the same carrier and dried to give a fuel adsorbent (which is designated as Comparative Sample C2). Properties of the sample were then determined in the manner described above. Results obtained are shown in Table 2.

TABLE 2

| | | Properties of the Samples | | | | |
|---|---|---|---|---|---|---|
| | Characteristic | Load at | Rate of Absorption (%) | | | |
| Sample | Treatment | Break (gf) | After 1 min. | After 5 min. | After 10 min. | After 60 min. |
| 7 | Not washed | 70–100 | 300 | 420 | 470 | 560 |
| 8 | Partially washed with warm water | 40–60 | 360 | 550 | 590 | 650 |
| 9 | Washed with solvent not dissolving dispersant | 50–80 | 320 | 460 | 520 | 590 |
| 10 | Not washed, but coated | 300–450 | 90 | 190 | 220 | 260 |
| 11 | Partially washed with warm water and coated | 150–250 | 140 | 250 | 310 | 410 |
| 12 | Washed with solvent not dissolving dispersant and coated | 200–330 | 110 | 220 | 260 | 320 |
| C2 | Completely washed with warm water (Comparative Sample) | 10–30 | 400 | 600 | 650 | 700 |

It would be understood from the table that the fuel absorbents according to the present invention (Samples 7 to 12) are higher in load at break (gf) than the control sample (Comparative Sample C2). This is because the fine polymer particles constituting the fuel absorbents according to the invention are bonded with PVA or dispersant and hence the absorbents as a whole can be physically stronger than the comparative sample.

It would also be understood that the physical strength of Sample 8 is a little inferior to that of Sample 7 or 9 since the amount of PVA used in Sample 8 is smaller than in Samples 7 and 9, and that Samples 10 to 12, which were prepared by applying a coating to Samples 7 to 9, have markedly improved physical strength, compared with Samples 7 to 9 not provided with a coating.

The fuel absorbents according to the present invention are therefore excellent in their durability against repeated absorption and desorption of fuel, as well as in their capacity for trapping or absorbing fuel.

In addition, the fuel absorbents according to the present invention are physically stronger as a whole as they are provided with a carrier that plays a role as a skeleton, and their fuel-absorbing capacity per unit volume is quite high since the fine polymer particles capable of absorbing fuel are positioned only on the surface of the carrier.

On the other hand, the control sample (comparative sample C2), although its absorbing capacity is quite high, is fairly inferior in load at break at the time when it has absorbed fuel since the PVA used as a dispersant during its production was washed away and the fine polymer particles constituting the sample are not bonded with PVA. Such an absorbent is therefore poor in durability against the repetition of the absorption-desorption cycle.

EXAMPLE 16 (THE THIRD ASPECT)

A fuel absorbent according to the invention was produced in the following manner.

In the first place, 24 g of ethylene-propylene-ethylidenenorbornene copolymer (EP 33, manufactured by Japan Synthetic Rubber Co.) as an organic polymer having the function of trapping fuel was dissolved into toluene (weight of the solution: 380 g).

Then, 16 g of EVA resin (EVAFLEX 420, manufactured by Mitsui Polychemical Co.) as a thermoplastic resin binder was additionally added to, and dissolved into, the solution (weight of the solution: 400 g).

To the resulting solution was added benzoyl peroxide as a crosslinking agent in an amount of 20 parts (reduced to 100% pure product), per 100 parts of the above polymer. To the resulting solution was added divinylbenzene as a crosslinking aid in an amount of 20 parts, per 100 parts of the above polymer. Nitrogen gas ($N_2$) was then bubbled into the thus prepared solution to remove oxygen dissolved therein as a deoxidation treatment.

On the other hand, 1,200 g of aqueous 1% solution of polyvinyl alcohol (PVA) as a dispersant having a polymerization degree of 500 and a saponification degree of 86.5 to 89 mol % was placed in a pressure vessel. A high power stirrer was fitted at the top of the vessel, and the vessel was then sealed. The vessel was evacuated and then filled with nitrogen. This deoxidation treatment was repeated three times to remove oxygen dissolved in the solution.

Thereafter, the EP-EVA solution prepared above was poured into the PVA solution contained in the pressure vessel, during which the latter solution was vigorously agitated by the stirrer to form a dispersion. After the completion of the pouring, the contents of pressure vessel were subjected to the same deoxidation treatment as above, and then stirred for an additional 15 minutes.

Subsequently, the stirrer was replaced with a conventional propeller stirrer, and the reaction mixture contained in the pressure vessel was stirred at 120 to 300 r.p.m., during which the temperature of the mixture was raised to 92° C. The resulting mixture was stirred for an additional 6 hours, and then a 20% solution in toluene of an antioxidant as a polymerization inhibitor was added to the reaction mixture to terminate the reaction.

After the completion of the reaction, the pressure vessel was cooled with ice water and then allowed to stand at room temperature for 3 hours, during which the reaction mixture separated into two phases: the upper creamy layer of fine polymer gel particles and the lower aqueous layer. The fine polymer gel particles of the upper layer were then collected.

Thereafter, the fine polymer gel particles were washed, using 0.2 liters of water of 60° C., per 100 g of the creamy particles. There were obtained fine polymer gel particles composed of fine polymer particles formed by the reaction of the organic polymer, and the thermoplastic resin. The thus obtained fine polymer gel particles were dried and granulated by adding them in portions into a high speed mixer. There were obtained jected to drying and granulation in the same manner as in Example 16, to give a fuel absorbent (which is designated as Comparative Sample C3). Results obtained are also shown in Table 3.

TABLE 3

| Sample | Characteristic Feature | Properties of the Samples | | | | |
|---|---|---|---|---|---|---|
| | | Load at Break (gf) | Rate of Absorption (%) | | | |
| | | | After 1 min. | After 5 min. | After 10 min. | After 60 min. |
| 13 | Not supported by carrier | 100–200 | 380 | 500 | 650 | 850 |
| 14 | Supported by carrier | 200–300 | 320 | 450 | 470 | 550 |
| C3 | No Thermoplastic resin used | 10–20 | 850 | 1,050 | 1,100 | 1,200 | intermediate granules having a diameter of 1 to 3 mm.

Subsequently, the granules were heated for 10 minutes at 100° C., which is higher than the fusing temperature of the EVA resin, to give a fuel absorbent according to the invention (which is designated as Sample 13).

The thus obtained fuel absorbent, as is schematically shown in FIG. 13, is composed of fine polymer particles 50 and the thermoplastic resin which is present around, and attached to, the particles 50. In other words, the fuel absorbent 5 consists of fine polymer particles 50 bonded to the surface of the carrier 55 with the fused thermoplastic resin 52 that functions as a binder.

EXAMPLE 17 (THE THIRD ASPECT)

The creamy fine polymer gel particles prepared in Example 16 was collected and washed with warm water as in Example 16. The resulting fine polymer gel particles were coated on the surface of polyethylene terephthalate fibers as a carrier of a diameter of ca. 1 mm. The coating was carried out by means of dipping. Thereafter, the carrier coated with the fine polymer gel particles was heated to 100° C., which is higher than the fusing temperature of the thermoplastic resin.

There was obtained a supported fuel absorbent having a diameter of ca. 1.5 mm (which is designated as Sample 14).

Figure 14:
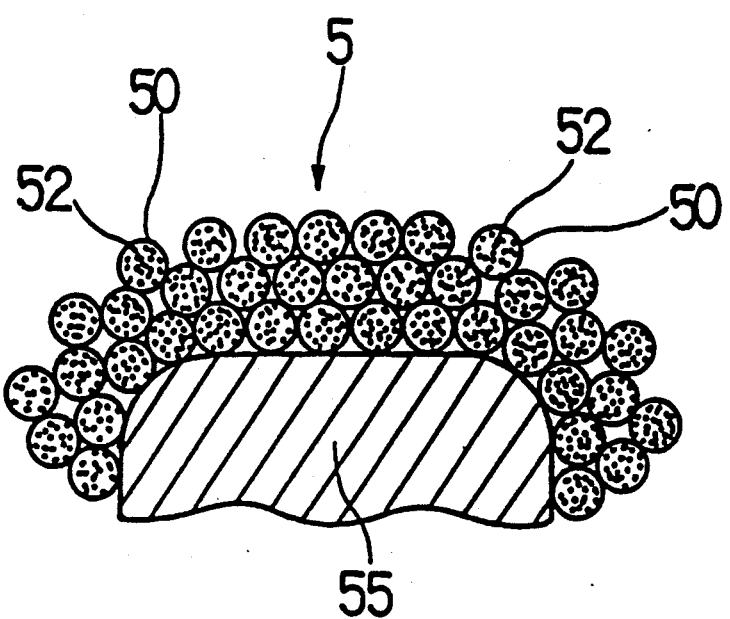
FIG. 14 is a schematic illustration showing the rate of fine polymer particles in the supported fuel absorbent according to Example 17.

As is schematically shown in FIG. 14, the thus produced supported fuel absorbent is composed of fine polymer particles 50 generated by the crosslinking of the organic polymer, the thermoplastic resin 52 which serves as a binder, and the carrier 55 bearing the fine particles 50 and the resin 52. In other words, the fuel absorbent 5 consists of fine polymer particles 50 bonded to the surface of the carrier 55 with the fused thermoplastic resin 52 functioning as a binder.

EXAMPLE 18 (THE THIRD ASPECT)

Properties of Samples 13 and 14 prepared in Examples 16 and 17 were determined in the same manner as in Example 7.

Results obtained are shown in Table 3.

Regarding Sample 14, about 0.2 grams of the sample of supported fuel absorbent (carrier, ca. 0.1 g; and the polymer materials, ca. 0.1 g) is placed in the same container (weight: V), and the total weight (W) of the sample and the container is weighed. The sample is treated in the same manner as in Example 7 and absorption rate was determined.

For the purpose of comparison, a creamy product of fine polymer gel particles was prepared in a similar manner as in Example 16, except that the thermoplastic resin as a binder was not used. The product was washed thoroughly with warm water up to a state where no PVA as a dispersant remained thereon, and then sub- It would be understood from Table 3 that the fuel absorbents according to the invention (Samples 13 and 14) are superior in load at break to the Comparative Sample (Comparative Sample C3). This is because the fine polymer particles constituting the fuel absorbents according to the invention are bound with the thermoplastic resin that functions as a binder, and hence the fuel absorbents as a whole can be physically stronger than the comparative sample.

In particular, Sample 14 is highly strong since they are supported by a carrier.

The fuel absorbents according to the invention therefore are also excellent in durability against the repetition of the absorption-desorption cycle.

On the other hand, the comparative sample (Comparative Sample C3), although its absorbing capacity is quite high, is fairly inferior in load at break at the time when it has absorbed fuel, because the fine polymer particles constituting the sample are not bonded with a thermoplastic resin. Such an absorbent is therefore poor in durability during the course of the absorption-desorption cycle.

EXAMPLE 19 (THE FOURTH ASPECT)

A fuel absorbent was produced in the following manner.

In the first place, 14 g of ethylene-propylene-ethylidenenorbornene copolymer (EP 33, manufactured by Japan Synthetic Rubber Co.) as an organic polymer having the function of trapping fuel was dissolved into toluene (weight of the solution: 140 g).

Subsequently, 9.3 g of powders of polyethylene (PE) resin thermoplastic resin powders was added to, and admixed with, the solution (weight of the mixture: 149.3 g). The powders of the thermoplastic resin had a grain size of ca. 30 μm.

To the resulting mixture was added benzoyl peroxide as a crosslinking agent in an amount of 20 parts (reduced to 100% pure product), per 100 parts of the above polymer. To the resulting mixture was additionally added divinylbenzene as a crosslinking aid in an amount of 20 parts, per 100 parts of the above polymer. Nitrogen gas was then bubbled into the thus prepared mixture to remove oxygen dissolved therein as a deoxidation treatment.

On the other hand, 800 g of aqueous 1% solution of polyvinyl alcohol (PVA) as a dispersant having a polymerization degree of 500 and a saponification degree of 86.5 to 89 mol % was placed in a pressure vessel. A high power stirrer was fitted at the top of the vessel, and the vessel was sealed. The vessel was evacuated and then filled with nitrogen gas. This deoxidation treatment was repeated three times to remove oxygen dissolved in the solution.

Thereafter, the deoxidized copolymer solution prepared above was poured with vigorous agitation into the deoxidized PVA solution contained in the pressure vessel, to form a dispersion. After the completion of the pouring, the pressure vessel was subjected to the same deoxidation treatment as above, and the contents were stirred for an additional 15 minutes.

The stirrer was replaced with a conventional propeller stirrer, and the reaction mixture contained in the vessel was stirred at 400 to 500 r.p.m., during which the temperature of the mixture was raised to 92° C. The resulting mixture was stirred for an additional 6 hours, and then a 20% solution of an antioxidant as a polymerization inhibitor in toluene was added to the reaction mixture to terminate the reaction.

After the completion of the reaction, the pressure vessel was cooled with ice water and then allowed to stand at room temperature for 3 hours, during which the reaction mixture separated into two phases: an upper creamy polymer gel layer, and a lower aqueous layer. The upper layer was then separated to collect a gel of fine polymer particles containing thermoplastic resin powders attached thereon, i.e., a thermoplastic resin powder-containing polymer gel. The polymer gel collected was subjected to granulation by charging them by small portions into a high speed mixer. There were obtained intermediate granules having a grain size of 1 to 3 mm.

The intermediate granules were then heated for 10 minutes at or above the fusing temperature (150° C.) of the thermoplastic resin (PE). There was obtained a granular fuel absorbent according to the invention (which is designated as Sample 15).

As is schematically shown in FIG. 15, the thus produced fuel absorbent is composed of fine polymer particles 50 generated by the crosslinking of the organic polymer, and a layer of thermoplastic resin powders 52 which are admixed with, and adhere to, the polymer particles 50. In the fuel absorbent 5, the thermoplastic resin powders 52 are fused to play a role as a binder for bonding the fine polymer particles 50.

EXAMPLE 20 (THE FOURTH ASPECT)

A thermoplastic resin powder-containing polymer gel was prepared in the same manner as in Example 19, except that the thermoplastic resin powders were added to a polymer gel of fine polymer gel particles produced without using any thermoplastic resin powders instead of being added to the solution of EP.

The thus obtained polymer gel was granulated and heated in the same manner as in Example 19.

There was obtained a fuel absorbent (Sample 16) having the same structure as the one shown in FIG. 15.

EXAMPLE 21 (THE FOURTH ASPECT)

The thermoplastic resin powder-containing polymer gel prepared in Example 19 was coated on the surface of a carrier of nylon fibers having a diameter of ca. 0.5 mm. The coating was performed by means of dipping. After the dipping, the coated carrier was heated at a temperature higher than the fusing temperature (150° C.) of the thermoplastic resin powders.

There was obtained a supported granular fuel absorbent having a diameter of ca. 0.8 mm (which is designated as Sample 17).

As is schematically shown in FIG. 16, the supported fuel absorbent so produced is composed of fine polymer particles 50 generated by the crosslinking of the organic polymer, a layer of thermoplastic resin powders 52 as a binder present around the particles, and carrier 55 supporting the particles and powders. In other words, the fuel absorbent 5 consists of a layer of fused thermoplastic resin powders 52 that plays a role as a binder to bind fine polymer particles 50 to the surface of the carrier 55.

EXAMPLE 22 (THE FOURTH ASPECT)

A thermoplastic resin powder-containing polymer gel was prepared in the same manner as in Example 20. The polymer gel was coated, dried and heated in the same manner as in Examples 20 and 21 to produce a supported fuel absorbent (which is designated as Sample 18).

The thus obtained fuel absorbent had the same structure as the one shown in FIG. 16.

EXAMPLE 23 (THE FOURTH ASPECT)

Properties of Samples 15 to 18 prepared in Examples 19 to 22 were determined in the same manner as in Example 7.

For the purpose of comparison, a control fuel absorbent (Comparative Sample C4) was prepared in the same manner as in Example 19, except that the thermoplastic resin powders were not added at all. Properties of the comparative sample was determined in the same manner as in Example 19. Results obtained are also shown in Table 4.

It would be understood from Table 4 that the fuel absorbents according to the invention (Samples 15 to 18) are superior in load at break to the comparative sample (Comparative Sample C4). This is because the fine polymer particles constituting the fuel absorbents according to the invention are bonded with the thermoplastic resin powders, and hence the fuel absorbents as a whole can be physically stronger than the comparative sample.

In particular, Samples 17 and 18 are highly strong since they are supported by a carrier.

The fuel absorbents according to the invention therefore are also excellent in durability against the repetition of the absorption-desorption cycle.

On the other hand, the comparative sample (Comparative Sample C4), although its absorbing capacity is quite high, is fairly inferior in load at break at the time when it has absorbed fuel, because the fine polymer particles constituting the sample are not bonded with a thermoplastic resin. Such an absorbent is therefore poor in the durability against the absorption-desorption cycle.

TABLE 4

| | Components | | Properties of the Samples | | | | |
|---|---|---|---|---|---|---|---|
| | Thermoplastic | | Load at | Rate of Absorption (%) | | | |
| Sample | Resin Powders | Carrier | Break (gf) | After 1 min. | After 5 min. | After 10 min. | After 60 min. |
| 15 | Added to reaction mixture | Not used | 50–100 | 320 | 370 | 410 | 480 |
| 16 | Added to gel | Not used | 80–150 | 280 | 320 | 340 | 410 |

TABLE 4-continued

| | Components | | Properties of the Samples | | | | |
|---|---|---|---|---|---|---|---|
| | Thermoplastic | | Load at | Rate of Absorption (%) | | | |
| Sample | Resin Powders | Carrier | Break (gf) | After 1 min. | After 5 min. | After 10 min. | After 60 min. |
| 17 | Added to reaction mixture | Used | 150-250 | 250 | 270 | 290 | 350 |
| 18 | Added to gel | Used | 200-300 | 200 | 220 | 240 | 280 |
| C4 | Not used | Not used | 10-20 | 850 | 1,050 | 1,100 | 1,200 |

EXAMPLE 24 (THE FIFTH ASPECT)

In the first place, a 10% solution of 20 g of ethylene-propylene-ethylidenenorbornene copolymer (EP 33, manufactured by Japan Synthetic Rubber Co.) as an organic polymer having the function of trapping fuel was prepared by dissolving the copolymer into toluene (weight of the solution: 200 g).

Subsequently, 13 g of powders of polyethylene (PE) resin as a thermoplastic resin powder was added to, and admixed with, the solution (weight of the mixture: 213 g). The powders had a grain size of ca. 30 μm.

To the resulting mixture was added benzoyl peroxide as a crosslinking agent in an amount of 20 parts (reduced to 100% pure product), per 100 parts of the above polymer. To the resulting mixture was added divinylbenzene as a crosslinking aid in an amount of 20 parts, per 100 parts of the above polymer. Nitrogen gas was then bubbled into the resulting mixture to remove oxygen dissolved therein as a deoxidation treatment.

On the other hand, 640 g of aqueous 1% solution of polyvinyl alcohol (PVA) as a dispersant having a polymerization degree of 500 and a saponification degree of 86.5 to 89 mol % was placed in a pressure vessel. A high power stirrer was fitted at the top of the vessel, and the vessel was sealed. The vessel was evacuated and then filled with nitrogen gas. This deoxidation treatment was repeated three times to remove oxygen dissolved in the solution.

Thereafter, the deoxidized copolymer solution prepared above was poured with vigorous agitation into the deoxidized PVA solution contained in the pressure vessel, to form a dispersion. After the completion of the pouring, the pressure vessel was subjected to the same deoxidation treatment as above, and the contents were stirred for an additional 15 minutes.

The stirrer was replaced with a conventional propeller stirrer, and the reaction mixture contained in the vessel was stirred at 120 to 300 r.p.m., during which the temperature of the mixture was raised to 92° C. The resulting mixture was stirred for an additional 6 hours, and then a 20% solution of an antioxidant as a polymerization inhibitor in toluene was added to the reaction mixture to terminate the reaction.

After the completion of the reaction, the pressure vessel was cooled with ice water and then allowed to stand at room temperature for 3 hours, during which the reaction mixture separated into two phases: an upper creamy polymer gel layer, and a lower aqueous layer. The upper layer was then separated to collect a polymer gel containing fine polymer particles generated by the reaction of the organic polymer, and thermoplastic resin powders attached on the surface of the particles.

Thereafter, the gel was coated on the surface of a thermoplastic carrier consisting of PE granules having a diameter of ca. 1.5 mm. The coating was performed by means of dipping.

The coated intermediate product was then heated for 3 minutes at a temperature higher than the fusing temperature (150° C.) of the PE resin used for the powders and higher than the fusing temperature (150° C.) of the PE resin used for the carrier. There was obtained a fuel absorbent according to the invention (which is designated as Sample 19).

As is schematically shown in FIG. 17, the thus produced fuel absorbent is composed of fine polymer particles 50 generated by the crosslinking of the organic polymer, thermoplastic resin powders 52 as a binder present around the particles, and a thermoplastic carrier 60 supporting the particles and powders.

To be more specific, the thermoplastic powders 52 are fused to function as a binder for binding the fine polymer particles 50. The powders and the particles are bonded to the surface of the thermoplastic carrier 60, forming a supported fuel absorbent 5. The bonding between the particles 50 and the carrier 60 is secured by the powders 52, so that the particles and carrier are fused and adhere mutually to each other.

EXAMPLE 25 (THE FIFTH ASPECT)

A polymer gel containing fine polymer particles and thermoplastic resin powders was prepared in a similar manner as in Example 24, except that the thermoplastic resin powders were added, instead of being added to the solution of EP 33, to a polymer gel of fine polymer particles produced from the organic polymer without using any thermoplastic resin powders. The polymeric gel was then coated on a thermoplastic carrier.

As is shown in FIG. 18, the thermoplastic carrier 6 was in the form of a granule consisting of a core 62 and a surface layer 63. The core 62 was made of polypropylene resin, and the surface layer 63 a PE resin, too. The diameter of the core 62 was ca. 0.8 mm, and the thickness of the surface layer 63 was ca. 0.1 mm.

The organic polymer and the thermoplastic resin powders were used in the same ratio as in Example 24.

Thereafter, the coated product was heated at 150° C., which is higher than the fusing temperature of the thermoplastic resin powders and that of the surface layer 63 of the carrier, to give a fuel absorbent according to the invention (which is designated as Sample 20). The heating was carried out in the same manner as in Example 24.

The thus obtained fuel absorbent, as is shown in FIG. 18, is composed of a thermoplastic carrier 6 consisting of a core 62 and a surface layer 63, and fine polymer particles 50 bonded with the fused thermoplastic resin powders 52.

EXAMPLE 26 (THE FIFTH ASPECT)

Properties of Samples 19 and 20 prepared in Examples 24 and 25 were determined in the same manner as in Example 7.

For the purpose of comparison, a creamy polymer gel containing fine polymer particles was prepared in a similar manner as in Example 24, except that the thermoplastic resin powders as a binder was not added at all. The polymer gel was subjected to granulation (without being applied on a carrier), to give a granular fuel absorbent (which is designated as Sample C5). The properties of the absorbent were determined. Results obtained are also shown in Table 5.

TABLE 5

| | Characteristics | | Properties of the Samples | | | | |
|---|---|---|---|---|---|---|---|
| | Thermoplastic | | Load at | Rate of Absorption (%) | | | |
| Sample | Resin Powders | Carrier | Break (gf) | After 1 min. | After 5 min. | After 10 min. | After 60 min. |
| 19 | Added to reaction mixture | Single Layer | 200-300 | 120 | 160 | 180 | 200 |
| 20 | Added to gel | Two Layered | 220-340 | 190 | 210 | 230 | 260 |
| C5 | Not added | Not used | 10-20 | 850 | 1,050 | 1,100 | 1,200 |

As would be understood from Table 5, the fuel absorbents according to the invention (Samples 19 and 20) are superior in load at break to the comparative sample (Comparative Sample C5). This is because the fine polymer particles constituting the fuel absorbents according to the invention are bonded not only by the fusion of the thermoplastic resin powders as a binder, but by the fusion of the thermoplastic carrier, and hence the fuel absorbents can be highly strong as a whole.

The fuel absorbents according to the invention therefore exhibit marked durability against repeated absorption and desorption of fuel.

In addition, the absorbents can also be excellent in their capacity for trapping fuel.

On the other hand, the comparative sample (Comparative Sample C5), although its absorbing capacity is quite high, is fairly inferior in the load at break at the time when it has absorbed fuel, because neither thermoplastic resin powders nor thermoplastic carriers are used to bond the fine polymer particles constituting the absorbent. Such an absorbent is therefore poor in the durability against the absorption-desorption cycle.

Having described out invention as related to the embodiment shown in the accompanying drawing, it is our intention that the invention be not limited by any of the details of description, unless otherwise specified, but rather be construed broadly within its spirit and scope as set out in the accompanying claims.

What is claimed is:

1. A process for producing a fuel absorbent, which comprises the steps of:
   dissolving an organic polymer having a function of trapping fuel in a solvent to produce a polymer solution;
   adding a crosslinking agent to said polymer solution to allow said organic polymer to react in the presence of said crosslinking agent; and
   bonding, after the completion of the crosslinking reaction, the resultant fine polymer gel particles with each other or on a carrier or both.

2. A process as in claim 1, wherein said organic polymer is a material selected from the group consisting of polypropylenes, polyethylenes, polyisoprenes, polybutadienes, polyisobutylenes, polystyrenes, polynorbornenes, polysiloxanes, ethylene-propylene-diene copolymers, styrene-butadiene copolymers, ethylene-propylene copolymer, isobutylene-isoprene copolymers, butadiene-acrylonitrile copolymer, ethylene-vinyl acetate copolymers, acrylic polymers, styrene-isoprene copolymers and polyepichlorohydrins.

3. A process as in claim 1, wherein said solvent is a material selected from the group consisting of toluene, benzene, xylene, dimethylbenzene, trimethylbenzene, cyclohexane, pentane, hexane, heptane methylene chloride, chloroform, carbon tetrachloride, trichloroethylene.

4. A process as in claim 1, wherein said crosslinking agent is used with a crosslinking aid.

5. A process as in claim 1, further comprising the steps of adding with stirring said polymer solution to a separately prepared solution containing a dispersant before adding said crosslinking agent, and subjecting said fine polymer gel particles collected after said crosslinking reaction to drying and then granulation, wherein at least part of said dispersant remains on said particles.

6. A process as in claim 5, wherein said fine polymer gel particles are washed with water of a temperature from 50° to 70° C., wherein said dispersant partly remains on said particles.

7. A process as in claim 5, wherein said fine polymer gel particles are washed with a solvent which does not dissolve said dispersant and thereafter dried and said dispersant partly remains on said particles.

8. A process as in claim 5, wherein, by said granulation, granules are obtained and said granules are coated with a reactive substance.

9. A process as in claim 8, wherein said reactive substance is a material selected from the group consisting of urethane, epoxy, silicone and amino thermosetting resin.

10. A process as in claim 5, wherein said dispersant is at least one of polyvinyl alcohols, gelatin, tragacanth gum, gum arabic, starch, methyl celluloses, carboxymethyl celluloses and polyacrylates.

11. A process as in claim 5, wherein said fine polymer gel particles have a grain size from 10 to 100 $\mu$m and said particles include said solvent and said dispersant.

12. A process as in claim 5, wherein said dried fine polymer gel particles containing said dispersant are granulated by a granulator to produce a granular fuel absorbent having a grain size from 1 to 5 mm.

13. A process as in claim 8, wherein the coating thickness of said reactive substance is in the range from 0.1 to 500 $\mu$m.

14. A process as in claim 1, further comprising the steps of adding with stirring said polymer solution to a separately prepared solution containing a dispersant before adding said crosslinking agent; coating said polymer gel particles, collected on a carrier after the completion of said crosslinking reaction, wherein at least part of said dispersant remains thereon; and then subjecting the dispersant coated particles on the carrier to drying.

15. A process as in claim 14, wherein said fine polymer gel particles are washed with warm water of a temperature from 50° to 70° C. and said dispersant partly remains on said particles before coating on said carrier.

16. A process as in claim 14, wherein said fine polymer gel particles are washed with a solvent and said solvent does not dissolve said dispersant before coating on said carrier.

17. A process as in claim 14, wherein said carrier is in the form of grains, plates, cloths, nets or threads.

18. A process as in claim 14, wherein said product, after being subjected to drying, is coated with a reactive substance.

19. A process as in claimed 18, wherein said reactive substance is a material selected from the group consisting of urethane, epoxy, and silicone thermosetting resins.

20. A process as in claim 18, wherein the coating thickness of said reactive substance is in the range from 0.1 to 500 $\mu$m.

21. A process as in claim 1, wherein a thermoplastic resin binder is dissolved in said solvent with said organic polymer, said fine polymer gel particles collected after the completion of said crosslinking reaction are dried and granulated to obtain intermediate granules, and said granules are heated to a temperature at which said thermoplastic resin binder fuses.

22. A process as in claim 21, wherein a crosslinking aid is additionally combined with said crosslinking agent, and the total amount of said crosslinking agent and said crosslinking aid is from 1 to 20% by weight, based on the amount of said organic polymer.

23. A process as in claim 21, wherein said collected fine polymer gel particles are coated on a carrier; and the coated product is dried and heated to a temperature at which said thermoplastic resin fuses, thus forming a fuel absorbent supported by said carrier.

24. A process as in claim 21, wherein said thermoplastic resin binder is a material selected from the group consisting of olefinic resins, styrene resins, acrylic resins, polycarbonate resins, and acid-modified polyolefin resins.

25. A process according to claim 24, wherein said olefinic resin is a material selected from the group consisting of polypropylenes, polyethylenes and ethyl-vinyl acetate copolymers.

26. A process according to claim 24, wherein said styrene resin is a material selected from the group consisting of polystyrenes and styrene-acrylonitrile copolymers.

27. A process according to claim 24, wherein said acid-modified polyolefin resin is a polyolefin grafted with maleic anhydride.

28. A process as in claim 21, wherein said fine polymer gel particles comprise said thermoplastic resin binder, said solvent and said dispersant.

29. A process as in claim 1, further comprising the steps of adding a binder of thermoplastic resin powders to said polymer solution before adding said crosslinking agent; subjecting, after collecting said resultant fine polymer gel particles containing said thermoplastic resin powders, said fine polymer gel particles to granulation to obtain intermediate granules; and then heating said granules to a temperature at which said thermoplastic resin powders fuse and adhere mutually.

30. A process as in claim 29, wherein said thermoplastic resin powder-containing polymer gel particles are coated on a surface of a thermoplastic carrier, and the resultant coated product is dried and heated to a temperature at which said thermoplastic resin powders and the surface of said carrier fuse and adhere mutually, thus forming a fuel absorbent supported by said carrier.

31. A process as in claim 29, wherein said thermoplastic resin powders contain at least one of polypropylene, polyethylene, polybutylterephthalate, polyethyleneterephthalate, polyoxymethylene and nylon.

32. A process as in claim 29, wherein the amount of said thermoplastic resin powders added is in the range from 20 to 70% by weight, based on the weight of said organic polymer.

33. A process as in claim 29, wherein said thermoplastic resin powders has a grain size in the range from 0.01 to 2000 $\mu$m.

34. A process as in claim 1, further comprising the steps of adding with stirring said polymer solution to a separately prepared solution containing a dispersant before adding said crosslinking agent; adding, after collecting said fine polymer gel particles, thermoplastic resin powders to said fine polymer gel particles; subjecting the resultant thermoplastic resin powder-containing polymer gel particles to granulation to obtain intermediate granules; and then heating said granules to a temperature at which said thermoplastic resin powders fuse and adhere mutually.

35. A process as in claim 34, wherein said thermoplastic resin powder-containing polymer gel particles are coated on a carrier, and the resultant coated product is dried and heated to a temperature at which said thermoplastic resin powders fuse and adhere mutually, thus forming a fuel absorbent supported by said carrier.

36. A process as in claim 34, wherein the amount of said thermoplastic resin powders added is in the range from 20 to 70% by weight, based on the weight of said organic polymer.

37. A process as in claim 34, wherein the grain size of said thermoplastic resin powders is in the range from 0.01 to 2000 $\mu$m.

38. A process as in claim 1, further comprising the steps of adding to said polymer solution thermoplastic resin powders as a binder before adding said crosslinking agent; coating, after collecting said resultant fine polymer gel particles containing said thermoplastic resin powders, said thermoplastic resin powder-containing polymer particles on a thermoplastic carrier; drying the coated product; and heating the dried product at a temperature at which said thermoplastic resin powders and the surface of said thermoplastic carrier fuse and adhere mutually, thus forming a fuel absorbent supported by said carrier.

39. A process as in claim 38, wherein said thermoplastic carrier comprises a core and a surface layer provided over said core, said surface layer having a melting point lower than a melting point of said core.

40. A process as in claim 38, wherein said thermoplastic resin powders contain at least one of polypropylene, polyethylene, polybutylterephthalate, polyethyleneterephthalate, polyoxymethylene and nylon.

41. A process as in claim 38, wherein the amount of said thermoplastic resin powders added is in the range of 20 to 70% by weight, based on the weight of said organic polymer.

42. A process as in claim 38, wherein said thermoplastic resin powders have a grain size in the range from 0.01 to 1000 $\mu$m.

43. A process as in claim 38, wherein said thermoplastic carrier is in the form of grains, plates, cloths, nets, or threads.

44. A process as in claim 38, wherein said thermoplastic carrier is a material selected from the group consisting of polypropylene, polyethylene, polybutylterephthalate, polyethyleneterephthalate, polyoxymethylene and nylon.

45. A process as in claim 39, wherein said surface layer of said thermoplastic carrier comprises a material selected from the group consisting of polypropylene, polyethylene, polybutylterephthalate, polyethyleneterephthalate, polyoxymethylene and nylon.

46. A process as in claim 39, wherein said core of said thermoplastic carrier comprises a material having a melting point higher than that of said surface layer and said material is selected from the group consisting of thermoplastic resins, thermosetting resins, metals, and ceramics.

47. A process according to claim 46, wherein said thermoplastic resin is a material selected from the group consisting of polypropylene, polyethylene, polybutylterephthalate, polyethyleneterephthalate, polyoxymethylene, nylon, polyimides, polysulfones, polyethersulfones, polyamidoimides, polyphenylene oxides and polyphenylene sulfides.

48. A process according to claim 46, wherein said thermosetting resin is a material selected from the group consisting of phenol, melamine, epoxy, polyimide, urea, unsaturated polyester, diallylphthalate, silicone, and polyurethane series.

49. A process as in claim 1, further comprising the steps of adding with stirring said polymer solution to a separately prepared solution containing a dispersant before adding a crosslinking agent; adding, after collecting said fine polymer gel particles, thermoplastic resin powders to said fine polymer gel particles; coating the resultant thermoplastic resin powder-containing polymer gel particles on a thermoplastic carrier; drying the coated product; and heating the dried product to a temperature at which said thermoplastic resin powders fuse and adhere mutually, thus forming a fuel absorbent supported by said carrier.

50. A process as in claim 49, wherein said thermoplastic carrier comprises a core and a surface layer provided over said core, wherein said surface layer's melting point is lower than said core's melting point.

51. A process as in claim 49, wherein said thermoplastic resin powders contain at least one of polypropylene, polyethylene, polybutylterephthalate, polyethyleneterephthalate, polyoxymethylene and nylon.

52. A process as in claim 49, wherein said thermoplastic resin powders are added in an amount in the range from 20 to 70% by weight, based on the weight of said organic polymer.

53. A process as in claim 49, wherein said thermoplastic resin powders have a grain size in the range from 0.01 to 1000 μm.

54. A process as in claim 49, wherein said thermoplastic carrier is in the form of grains, plates, cloths, nets, or threads.

55. A process as in claim 49, wherein said thermoplastic carrier is a material selected from the group consisting of polypropylene, polyethylene, polybutylterephthalate, polyethyleneterephthalate, polyoxymethylene and nylon.

56. A process as in claim 50, wherein said surface layer of said thermoplastic carrier is a material selected from the group consisting of polypropylene, polyethylene, polybutylterephthalate, polyethyleneterephthalate, polyoxymethylene and nylon.

57. A process as in claim 50, wherein said core of said thermoplastic carrier is a material having a melting point higher than that of said surface layer and is selected from the group consisting of thermoplastic resins, thermosetting resins, metals, and ceramics.

58. A process according to claim 57, wherein said thermoplastic resin is a material selected from the group consisting of polypropylene, polyethylene, polybutylterephthalate, polyethyleneterephthalate, polyoxymethylene, nylon, polyimides, polysulfones, polyethersulfones, polyamidoimides, polyphenylene oxides and polyphenylene sulfides.

59. A process according to claim 57, wherein said thermosetting resin is a material selected from the group consisting of phenol, melamine, epoxy, polyimide, urea, unsaturated polyester, diallylphthalate, silicone, and polyurethane series.

* * * * *